(12) United States Patent
Arima et al.

(10) Patent No.: US 10,491,128 B2
(45) Date of Patent: Nov. 26, 2019

(54) POWER CONTROLLING SEMICONDUCTOR DEVICE, SWITCHED-MODE POWER SUPPLY, AND METHOD OF DESIGNING THE DEVICE AND POWER-SUPPLY

(71) Applicants: Satoshi Arima, Isehara (JP); Hiroki Matsuda, Zama (JP); Yukio Murata, Tokyo (JP)

(72) Inventors: Satoshi Arima, Isehara (JP); Hiroki Matsuda, Zama (JP); Yukio Murata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/297,382

(22) Filed: Mar. 8, 2019

(65) Prior Publication Data

US 2019/0334428 A1 Oct. 31, 2019

(30) Foreign Application Priority Data

Apr. 25, 2018 (JP) ................. 2018-084161

(51) Int. Cl.
*H02M 3/335* (2006.01)
*H02M 1/32* (2007.01)
(Continued)

(52) U.S. Cl.
CPC ......... *H02M 3/33523* (2013.01); *H02M 1/08* (2013.01); *H02M 1/14* (2013.01);
(Continued)

(58) Field of Classification Search
CPC ...... H02M 3/33523; H02M 1/32; H02M 1/08; H02M 1/14; H02M 2001/0009; H02M 3/335; H02M 2001/0048
See application file for complete search history.

(56) References Cited

U.S. PATENT DOCUMENTS 6,674,656 B1 * 1/2004 Yang ................. H02M 3/33523
363/21.1
9,825,540 B2 11/2017 Yabuzaki
(Continued)

FOREIGN PATENT DOCUMENTS

JP 2005341730 A 12/2005
JP 2017127109 A 7/2017

*Primary Examiner* — Kyle J Moody
(74) *Attorney, Agent, or Firm* — Holtz, Holtz & Volek PC

(57) ABSTRACT

A power controlling semiconductor device generates a drive pulse to turn on or off a switching device which applies an intermittent current to a primary side winding of a transformer in response to a voltage proportional to a present current flowing through the primary side winding of the transformer and to an output voltage detection signal from a secondary side of the transformer. The device includes a current detecting terminal and an overcurrent detecting circuit. The voltage proportional to the present current flowing through the primary side winding is applied to the current detecting terminal. The overcurrent detecting circuit compares a voltage corresponding to the voltage applied to the current detecting terminal with an upper limit current detecting voltage to detect an overcurrent. A correction current is applied to a correction resistor connected to the current detecting terminal for a shift in the voltage.

10 Claims, 19 Drawing Sheets

(51) Int. Cl.
*H02M 1/14* (2006.01)
*H02M 1/08* (2006.01)
*H02M 1/00* (2006.01)

(52) U.S. Cl.
CPC .............. *H02M 1/32* (2013.01); *H02M 3/335* (2013.01); *H02M 2001/0009* (2013.01); *H02M 2001/0048* (2013.01)

(56) References Cited

U.S. PATENT DOCUMENTS

| | | | | |
|---|---|---|---|---|
| 2012/0147630 | A1* | 6/2012 | Cao | H02M 1/32 363/21.15 |
| 2013/0135775 | A1* | 5/2013 | Yao | H02H 9/025 361/18 |
| 2014/0362610 | A1* | 12/2014 | Stracquadaini | H02M 3/33507 363/21.13 |

* cited by examiner

C0 : Rs=r2, Rcomp=0
C1 : Rs=r2, Rcomp=r7
C2 : Rs=r2, Rcomp=r5
r7<r5

C1 : Vout=Vout1
C2 : Vout=Vout2

C1 : Vout=Vout1
C2 : Vout=Vout2

POWER CONTROLLING SEMICONDUCTOR DEVICE, SWITCHED-MODE POWER SUPPLY, AND METHOD OF DESIGNING THE DEVICE AND POWER-SUPPLY

CROSS REFERENCE TO RELATED APPLICATION

This application is based upon and claims the benefit of priority under 35 USC 119 of Japanese Patent Application No. 2018-084161 filed on Apr. 25, 2018, the entire disclosure of which, including the description, claims, drawings and abstract, is incorporated herein by reference in its entirety.

BACKGROUND OF THE INVENTION

1. Field of the Invention

The present invention relates to a power controlling semiconductor device, a DC power supply including such a device, and a method of designing the device and the power supply. In particular, the present invention relates to a technique useful in correction of the operating point of an overcurrent protection circuit and adjustment of output ripples in a primary circuit of a transformer disposed in an insulated switched-mode DC power supply.

2. Description of Related Art

A typical DC power supply is an insulated AC-DC converter consisting of a diode bridge circuit that rectifies AC power into DC power and a DC-DC converter that lowers the voltage of the DC power from the diode bridge circuit to a desired potential. One of the known insulated AC-DC converters includes a switched-mode power supply that turns on or off a switching device connected in series to a primary side winding, for example, by a pulse width modulation (PWM) controlling scheme or a pulse frequency modulation (PFM) controlling scheme for control of the current through the primary side winding and the induced voltage from a secondary side winding.

The switched-mode power supply has a predetermined rated load current or a maximum load current. Since an increase in current exceeding the rated load current or an overcurrent in the secondary side may damage the power supply in some cases, a primary control circuit may be provided that has an overcurrent detecting function and overcurrent protecting function to turn off the switching device in response to the detection of the overcurrent. JP 2005-341730A discloses a scheme for detection of overcurrent at a load in a switched-mode power supply, where a resistor connected in series to a primary switching device is disposed for detection of the current and monitoring of the voltage converted from current at the resistor or the peak of the voltage having a triangular waveform.

Traditional switched-mode power supplies usually have fixed rates of output voltages. Meanwhile, power supplies capable of shifting the output voltages among, for example, 5V, 9V, 15V . . . , are desired in response to requirements on devices, such as USB power delivery (PD), at the load.

For example, JP 2017-127109A discloses a switched-mode power supply provided with such a switching scheme.

In the case of the design of the switched-mode power supply that can switch an output voltage, various ideas have been proposed on the determination of the output current corresponding to the output voltage during the overcurrent protective operation (hereinafter referred to as an output overcurrent limit). For example, the output overcurrent limit may be lowered as the output voltage increases or may be kept substantially constant despite a variation in output voltage.

Unfortunately, the switched-mode power supply disclosed in JP 2017-127109A includes a controlling integrated circuit (IC) provided with a switching device and an overcurrent protection controlling circuit at a primary side. When the output voltage decreases, the overcurrent protection controlling circuit switches the overcurrent limit of the switching device from a high reference voltage to a low reference voltage and the maximum limit of the switching frequency from a high value to a low value. Thus, the output current during the overcurrent protective operation is determined in response to the output voltage.

In the case of the design of a switched-mode power supply including such a controlling IC, a designer cannot freely determine the output overcurrent limit after the determination of the output voltage. The switched-mode power supply in JP 2017-127109A inevitably determines a low switching frequency after a low output voltage is determined, resulting in high output ripples.

SUMMARY OF THE INVENTION

An object of the present invention, which has been made to solve the above mentioned problem, is to provide a power controlling semiconductor device of a switched-mode power supply that includes a transformer turning on or off the current flowing through a primary side winding for output control, where the relation between an output voltage and an output overcurrent limit can be freely varied when the output voltage is switched in response to a request from a device at the load.

Another object of the present invention is to provide a power controlling semiconductor device that can switch the output voltage freely determine the relation between the output voltage and an output ripple and to provide a switched-mode power supply including such a device.

To achieve at least one of the abovementioned objects, according to an aspect of the present invention, a power controlling semiconductor device generates a drive pulse to turn on or off a switching device which applies an intermittent current to a primary side winding of a transformer in response to a voltage proportional to a present current flowing through the primary side winding of the transformer and to an output voltage detection signal from a secondary side of the transformer.

The device includes:

a current detecting terminal to which the voltage proportional to the present current flowing through the primary side winding is applied;

an overcurrent detecting circuit which compares a voltage corresponding to the voltage applied to the current detecting terminal with an upper limit current detecting voltage to detect an overcurrent in the secondary side of the transformer;

a turning-on signal generating circuit which generates a turning-on signal for periodically turning on the switching device;

a turning-off signal generating circuit which generates a turning-off signal for turning off the switching device in response to the overcurrent detected by the overcurrent detecting circuit; and a correction current generating circuit which applies a correction current to the current detecting terminal, the correction current corresponding to the output voltage at the secondary side of the transformer, wherein the correction current generated by the correction current generating circuit is applied to a correction resistor connected to the current detecting terminal for a shift in the voltage applied to the current detecting terminal.

The correction resistor may be an external component connected to the current detecting terminal or a resistance switch disposed in a semiconductor chip.

In accordance with the power controlling semiconductor device having the configuration described above, the correction current is applied to the correction resistor and the voltage applied to the current detecting terminal is shifted thereby. The apparent upper limit current detecting voltage can be thereby varied, and the correction current generated by the correction current generating circuit shifts in response to the output voltage at the secondary side of the transformer. Hence, the voltage applied to the current detecting terminal can vary in response to the output voltage. Thus, the output overcurrent limit corresponding to the output voltage can be freely determined. As a result, multiple output voltages can be determined in, for example, a power supply in accordance with the USB-PD standard. Appropriate output overcurrent limits can be determined in response to the levels of the output voltages in the power supply.

Preferably, the power controlling semiconductor device further includes:

a control terminal which receives the output voltage detection signal; and an overcurrent limiting voltage generator which generates a predetermined overcurrent limiting voltage, wherein the turning-off signal generating circuit comprises:
 a voltage selector which selects a lower one of a voltage corresponding to the voltage at the control terminal and the overcurrent limiting voltage as the upper limit current detecting voltage; and
 a voltage comparing circuit which compares the upper limit current detecting voltage selected by the voltage selector with the voltage corresponding to the voltage applied to the current detecting terminal.

The "voltage corresponding to the voltage at the control terminal" includes, for example, a voltage at the control terminal, a voltage applied through a buffer, a voltage divided or amplified from the voltage at the control terminal, and a voltage applied through a slope compensation circuit for prevention of subharmonic oscillation.

The "voltage corresponding to the voltage applied to the current detecting terminal" includes, for example, the voltage at the current detecting terminal, a voltage shifted at the current detecting terminal by the applied correction current through a correction resistor in a semiconductor chip, and a voltage amplified from the voltage at the current detecting terminal or the voltage shifted from the voltage at the current detecting terminal by a non-inverting amplifier.

In accordance with the configuration described above, the turn-off signal for the switching device can be generated after the voltage at the current detecting terminal reaches the voltage at the control terminal in response to the voltage detection signal during the normal operation. The turn-off signal for the switching device can be generated after the voltage at the current detecting terminal reaches the overcurrent limiting voltage during the overcurrent protective operation. Thus, a seamless transition can be achieved between the normal operation and the overcurrent protective operation.

Preferably, the transformer comprises a auxiliary winding, and the correction current generating circuit comprises:

a sample holding circuit which holds a voltage corresponding to a voltage induced in the auxiliary winding or a divided voltage from the induced voltage during a demagnetization period of the transformer after turning-off of the switching device; and a voltage-current converting circuit which generates a current corresponding to the voltage held in the sample holding circuit.

The "voltage corresponding to" includes a voltage before a calculation by an arithmetic circuit, which will be described below in an embodiment, and a voltage after the calculation.

The configuration above can achieve an efficient correction current generating circuit generating a desired correction current.

Preferably, the correction current generating circuit generates the correction current in response to the output voltage detection signal, the voltage induced in the auxiliary winding, or the divided voltage from the induced voltage, such that, if a level of the output voltage detection signal increases from a first level to a second level, the correction current is adjusted to decrease the level of the output voltage detection signal to the first level or below.

In designing of a power supply having desired characteristics of the output current versus the switching frequency, the switching frequency in a predetermined output current range can be reduced, resulting in an enhanced power conversion efficiency.

Preferably, the turning-on signal generating circuit comprises an oscillating circuit which generates an oscillation signal at a predetermined frequency, and the oscillating circuit generates the oscillation signal at a frequency corresponding to the voltage at the control terminal receiving the output voltage detection signal.

Free determination of the relation between the output voltage and the output ripple can achieve a power supply having a low output ripple. As the frequency increases at the predetermined output voltage and current, the ripple restriction effect is enhanced.

Preferably, a switched-mode power supply includes:
 the power controlling semiconductor device;
 a transformer;
 a switching device which is connected in series to a primary side winding of the transformer;
 a current-voltage converting resistor which is connected in series to the switching device and applies a voltage converted from a current to the current detecting terminal;
 an output voltage detector which detects an output voltage at a secondary side of the transformer and transmits a detection signal to the power controlling semiconductor device; and
 a correction resistor which is connected between the current detecting terminal and one terminal of the current-voltage converting resistor.

A switched-mode power supply can be achieved that can vary the output voltage in response to a request from a device at the load and appropriately determine the output overcurrent limit.

According to another aspect of the present invention, a method of designing a switched-mode power supply includes the power controlling semiconductor device.

The method includes:
 determining the number of windings and a voltage dividing ratio of a first resistor to a second resistor such that an input voltage is applied to a terminal and generates a first correction current at a first output voltage and a second correction current at a second output voltage, an induced voltage from the auxiliary winding or a divided voltage which is divided from the induced voltage being applied to the terminal, the first resistor and the second resistor being connected to the auxiliary winding;

determining a first current limit and a second current limit for the switching device to generate a first output current at the first output voltage or a second output current at the second output voltage in the secondary side of the transformer; and determining resistances of a current-voltage converting resistor and a correction resistor such that the resistances serve as the first and second current limits for the switching device if the first and second output voltages and the upper limit current detecting voltage serve as overcurrent limiting voltages, the current-voltage converting resistor and the correction resistor being connected to the current detecting terminal.

Such a method can achieve the designing of a switched-mode power supply that can vary the output voltage and has desired characteristics of the output overcurrent limit versus the output voltage.

According to still another aspect of the present invention, a method of designing a switched-mode power supply includes the power controlling semiconductor device.

The method includes:

determining a first upper limit current detecting voltage at a first output voltage and a first output current at the secondary side of the transformer;

determining the resistance of a current-voltage converting resistor connected to the current detecting terminal such that the first upper limit current detecting voltage is equal to the first output voltage at the first output current in the secondary side of the transformer;

determining a second upper limit current detecting voltage equal to a second output voltage at a second output current in the secondary side of the transformer; and determining the resistance of the correction resistor such that the second upper limit current detecting voltage is equal to the second output voltage at the second output current in response to the correction current corresponding to the output voltage applied to the secondary side of the transformer by a correction current generating circuit and such that the frequency for turning on or off a switching device is held at or below a predetermined value.

Such a method can achieve the designing of a switched-mode power supply that can vary the output voltage and has a low output ripple after switching to a low output voltage.

In accordance with the present invention, the power controlling semiconductor device of a switched-mode power supply that includes a transformer turns on or off the current flowing through a primary side winding for output control, where the relation between the output voltage and the output overcurrent limit can be freely varied when the output voltage is switched in response to a request from a device at the load. The power controlling semiconductor device that can switch the output voltage freely determines the relation between the output voltage and the output ripple and to provide a switched-mode power supply including such a device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE PREFERRED EMBODIMENT

Preferred embodiments of the present invention will now be described with reference to the accompanying drawings.

First Embodiment

A switched-mode power supply according to a first embodiment can vary its output voltage in response to a request from a device at the load and freely determine the relation between the output voltage and the output current during an overcurrent protective operation or an output overcurrent limit.

Figure 1:
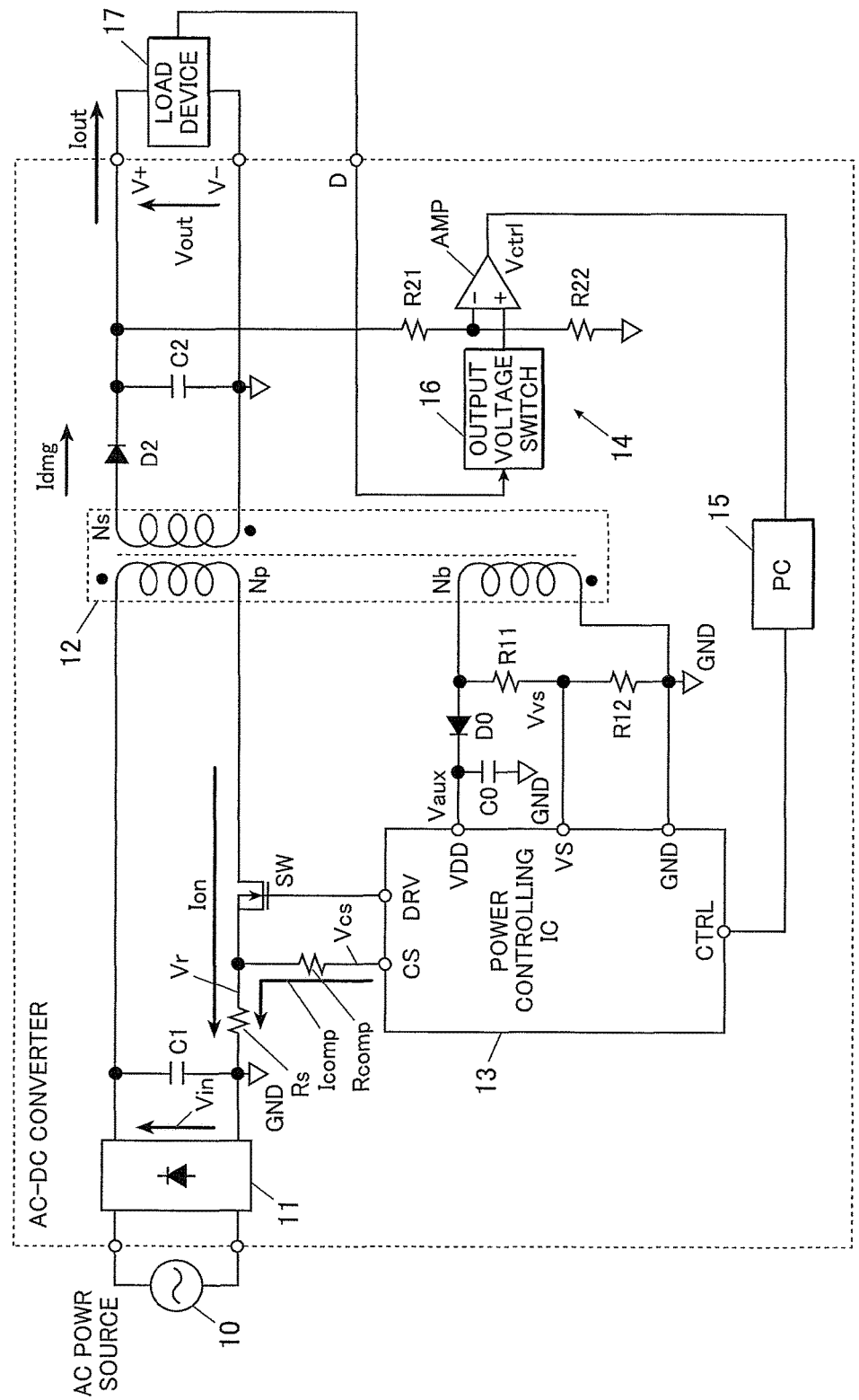
FIG. 1 illustrates a circuit configuration of a switched-mode power supply or an AC-DC converter according to an embodiment of the present invention.

FIG. 1 illustrates a circuit configuration of a switched-mode power supply or an AC-DC converter according to the first embodiment of the present invention.

The AC-DC converter according to this embodiment includes a diode bridge circuit 11 rectifying the AC voltage from a AC power source 10; a capacitor C1 smoothing the rectified voltage; a transformer 12 including a primary side winding Np, a secondary side winding Ns, and a auxiliary winding Nb, and a switching transistor SW including a N-type MOSFET connected in series to the primary side winding Np of the transformer 12; and a power controlling circuit 13 turning on or off the switching transistor SW.

In the present embodiment, the power controlling circuit 13 is a semiconductor integrated circuit in one semiconductor chip composed of, for example, a monocrystalline silicon (hereinafter referred to as "power controlling IC") and includes an external terminal DRV outputting signals for turning on or off of the switching transistor SW to a gate terminal of the switching transistor SW.

At the secondary side of the transformer 12, a rectifying diode D2 is connected in series to the secondary side winding Ns. A smoothing capacitor C2 is connected between the cathode terminal of the diode D2 and a ground point GND. The currents intermittently passing through the primary side winding Np induces AC voltages in the secondary side winding Ns. The AC is rectified through the diode D2 and smoothed by the capacitor C2, which then outputs a DC voltage Vout in proportional to the turn ratio of the primary side winding Np to the secondary side winding Ns.

An output voltage detecting circuit 14 is also disposed at the secondary side of the transformer 12 for detection of the output voltage Vout. A photocoupler (PC) 15 is disposed between the output voltage detecting circuit 14 and the power controlling IC 13 to transmit an output voltage detection signal in response to the voltage detected by the output voltage detecting circuit 14 to a control terminal CTRL of the power controlling IC 13.

The output voltage detecting circuit 14 includes resistors R21 and R22 dividing the output voltage Vout and an error amplifier AMP receiving the voltage divided by the resistors R21 and R22. The error amplifier AMP generates a voltage corresponding to the difference in potential between a reference voltage at an output voltage switch 16 and the voltage divided by the resistors R11 and R12. The output voltage switch 16 can change the reference voltage to be generated in response to an output voltage switching instruction (a binary code or an analog signal) from a load device 17, for example, a USB device operating at the output voltage Vout of the AC-DC converter. The changed reference voltage varies the output voltage of the error amplifier AMP and the output voltage detection signal feed backed to the primary side, resulting in a variation in the active time of the switching transistor SW by the power controlling IC 13. Thus, the output voltage Vout corresponding to the reference voltage is output from the AC-DC converter. The output voltage switch may have any configuration that can vary the output voltage, besides that described above.

In the present embodiment, a current detecting resistor Rs is connected between a source terminal of the switching transistor SW and a ground point GND. The current detecting resistor Rs applies a detection voltage Vr to a current detecting terminal CS of the power controlling IC 13 through a correction resistor Rcomp.

The AC-DC converter in this embodiment includes a rectifying/smoothing circuit at the primary side. The rectifying/smoothing circuit includes a rectifying diode D0 connected in series to the auxiliary winding Nb and a smoothing capacitor C0 connected between the cathode terminal of the diode D0 and the ground point GND. A voltage Vaux rectified and smoothed in the rectifying/smoothing circuit is applied to a power voltage terminal VDD of the power controlling IC 13. The terminals of the auxiliary winding Nb are connected to voltage dividing resistors R11 and R12, respectively. The resistors R11 and R12 divide a voltage Vvs and apply the divided voltage Vvs to a voltage detection terminal VS of the power controlling IC 13.

An exemplary functional circuit configuration of the power controlling IC 13 according to the first embodiment will now be described with reference to FIG. 2.

Figure 2:
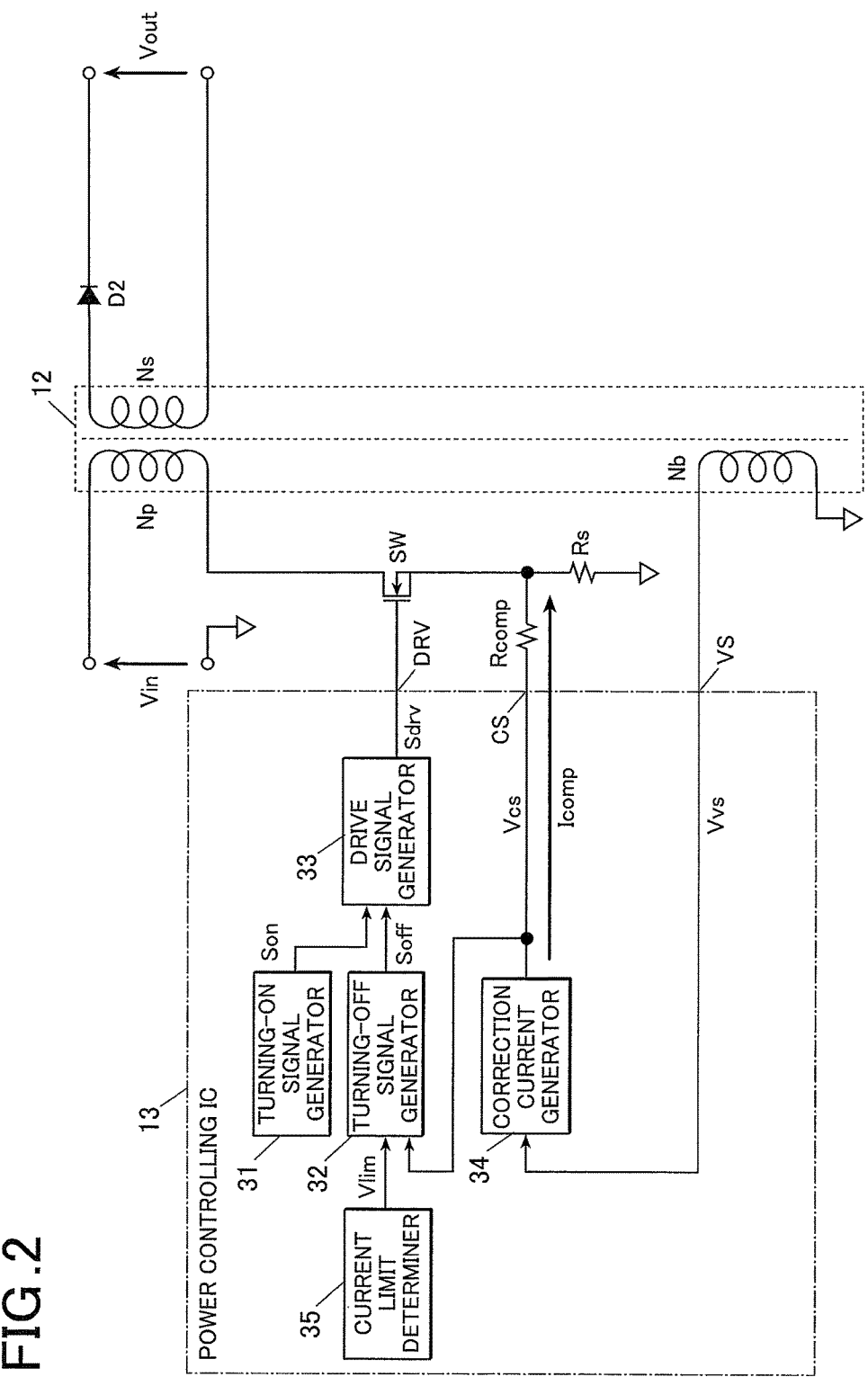
FIG. 2 is a block diagram illustrating the AC-DC converter in FIG. 1 including a transformer and a switching power controlling circuit (power controlling IC) at a primary side according to a first embodiment.

As illustrated in FIG. 2, the power controlling IC 13 according to the present embodiment includes a turning-on signal generator 31 generating a turning-on signal Son indicating the timing for turning on the primary switching transistor SW, for example, a clock signal having a predetermined frequency; and a turning-off signal generator 32 comparing a voltage Vcs at the current detecting terminal CS with an upper limit current detecting voltage Vlim to generate a turning-off signal Soff indicating the timing for turning off the switching transistor SW.

The power controlling IC 13 includes a drive pulse generator 33 generating a drive signal (drive pulse) Sdry for the switching transistor SW in response to the turning-on signal Son generated by the turning-on signal generator 31 and the turning-off signal Soff generated by the turning-off signal generator 32. The power controlling IC 13 also includes a correction current generator 34 generating a correction current Icomp corresponding to a voltage Vvs at the voltage detection terminal VS to apply the correction current Icomp to the current detecting terminal CS; and a current limit determiner 35 applying an upper limit current detecting voltage Vlim. The voltage Vvs at the voltage detection terminal VS is generated by dividing the voltage induced in the auxiliary winding Nb with the external series resistors R11 and R12. The voltage induced in the auxiliary winding Nb is proportional to the sum of the output voltage Vout at the secondary side of the AC-DC converter and a forward voltage VF at the diode D2. The forward voltage VF is constant regardless of the output voltage Vout. Thus, the correction current Icomp corresponds to the output voltage Vout.

The correction current Icomp generated by the correction current generator 34 is applied from the current detecting terminal CS through the correction resistor Rcomp and the current detecting resistor Rs to a ground point. The voltage at the current detecting terminal CS is thereby raised or shifted. The correction resistor Rcomp and the current detecting resistor Rs are external resistors. Thus, a user or designer of the IC can freely determine the resistances of the correction resistor Rcomp and the current detecting resistor Rs and design a switched-mode power supply with desired characteristics of the output overcurrent limit versus the output voltage.

The characteristics of the output overcurrent limit versus the output voltage of the power controlling IC 13 after variations of the resistances of the correction resistor Rcomp and the current detecting resistor Rs and the overcurrent protective operation will now be described.

Figure 3A:
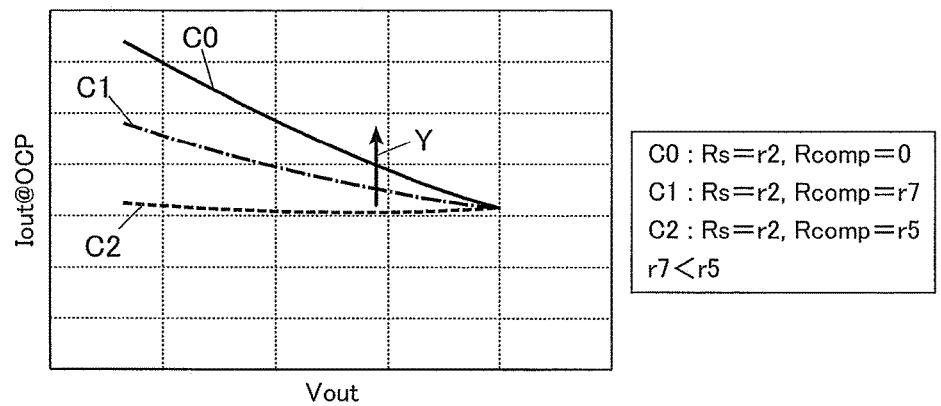
FIG. 3A is a graph indicating a shift of a characteristic curve of an output overcurrent limit versus an output voltage during an overcurrent protective operation after variations of the resistance of a correction resistor of the AC-DC converter including the power controlling IC according to the first embodiment.

As described above, the correction current Icomp generated by the correction current generator 34 passes through the correction resistor Rcomp and raises the voltage at the current detecting terminal CS. Thus, the voltage Vcs increases as the correction current Icomp rises. Thus, the overcurrent protection in the power controlling IC with the correction resistor Rcomp and the overcurrent protection works at a low output voltage Vout compared to a power controlling IC without the correction resistor Rcomp and the correction current generator 34. FIG. 3A indicates the shift of a characteristic curve of the output overcurrent limit versus the output voltage at a constant resistance of the current detecting resistor Rs and a varied resistance of the correction resistor Rcomp.

In FIG. 3A, the curve C0 indicates the characteristics of the output overcurrent limit versus the output voltage where the correction resistor Rcomp has a resistance of "zero", in other words, a compensation voltage Vcomp is zero and thus no correction is performed. The curve C0 slopes down to the right. In other words, the output overcurrent limit decreases as the output voltage Vout increases. In contrast, the correction resistor Rcomp with a resistance of 2 kΩ or 4 kΩ connected to the current detecting terminal CS produces a characteristic curve C1 or C2 with a gentler slope, in FIG. 3A.

Variations in the resistances of the current detecting resistor Rs and the correction resistor Rcomp can upwardly or downwardly shift the characteristic curve as illustrated by an arrow Y in FIG. 3A. As a result, the variations in the resistances of the current detecting resistor Rs and the correction resistor Rcomp can achieve the characteristic curves illustrated in FIG. 3B.

Figure 4:
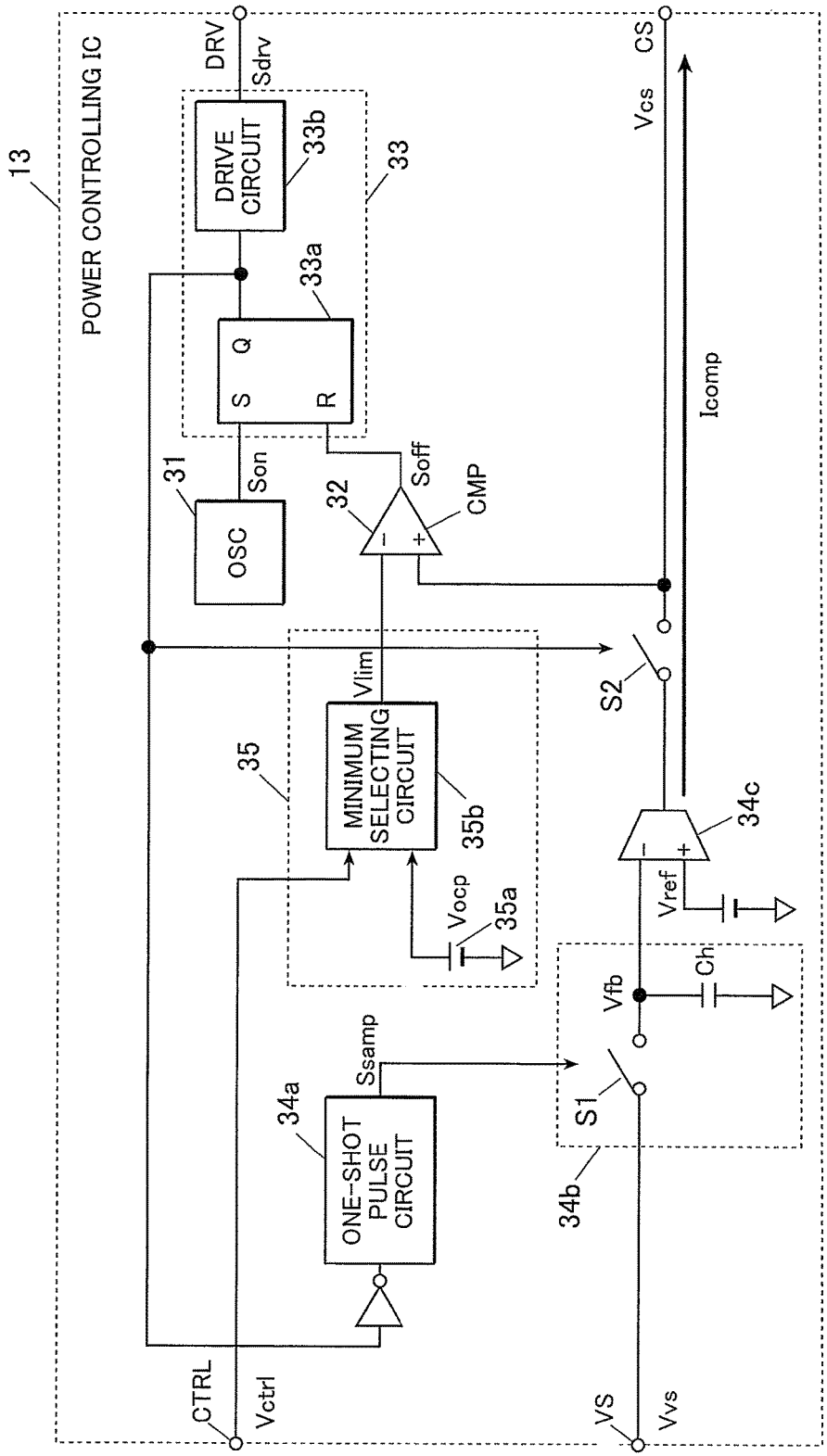
FIG. 4 illustrates a specific circuit configuration of the power controlling IC according to the first embodiment.

FIG. 4 illustrates a specific circuit configuration of the power controlling IC 13 in FIG. 2.

As illustrated in FIG. 4, the turning-on signal generator 31, which generates the turning-on signal Son in the power controlling IC 13 in this embodiment, includes an oscillating circuit OSC, for example, a ring oscillator oscillating at a predetermined frequency. The turning-on signal generator 31 may include, for example, an oscillating circuit including a transducer and a divider dividing frequencies of oscillation signals generated by the oscillating circuit. The turning-on signal generator 31 may be an oscillating circuit shifting the oscillating frequency in response to the control voltage Vctrl at the control terminal CTRL.

The current limit determiner 35 includes an overcurrent limiting voltage generator 35a, for example, a reference voltage circuit generating an overcurrent limiting voltage Vocp and a minimum selector 35b selecting the lower one of the generated overcurrent limiting voltage Vocp and the control voltage Vctrl at the control terminal CTRL (or a voltage shifted from the control voltage Vctrl and amplified by an amplifier). The turning-off signal generator 32 generating the turning-off signal Soff includes a voltage comparing circuit CMP comparing the upper limit current detecting voltage Vlim (Vocp or Vctrl) with the voltage Vcs at the current detecting terminal CS. Instead of the minimum selector 35b, the current limit determiner 35 may include a first voltage comparing circuit comparing the upper limit current detecting voltage Vlim with the voltage Vcs at the current detecting terminal CS; a second voltage comparing circuit comparing the control voltage Vctrl at the control terminal CTRL with the voltage Vcs at the current detecting terminal CS; and a circuit selecting the earlier one of the signal from the first voltage comparing circuit and that from the second voltage comparing circuit or an OR gate taking a logical add of the signals from the two voltage comparing circuits.

Figure 8:
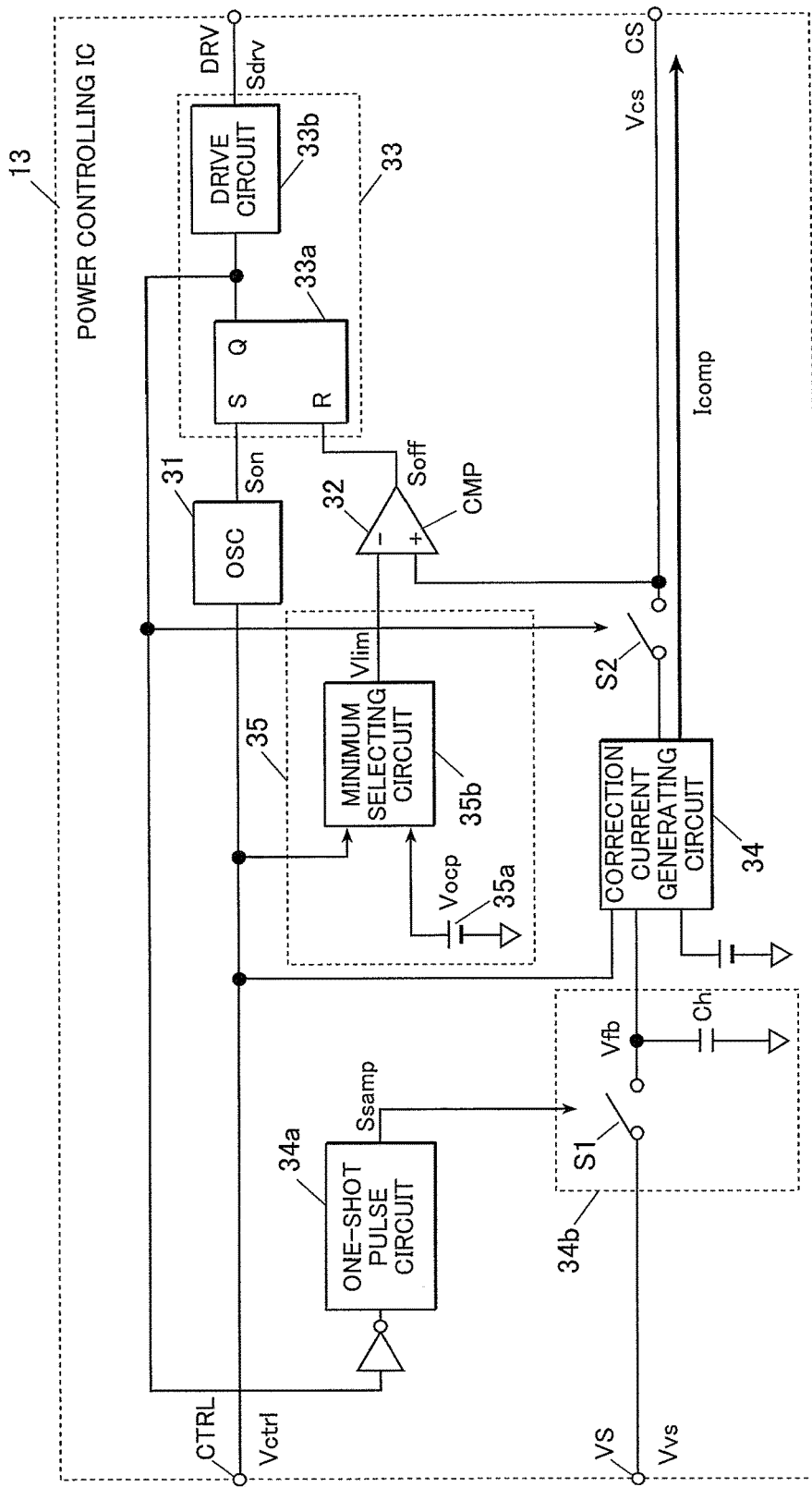
FIG. 8 illustrate a circuit configuration of a variation in the power controlling IC according to the first embodiment.
Figure 15:
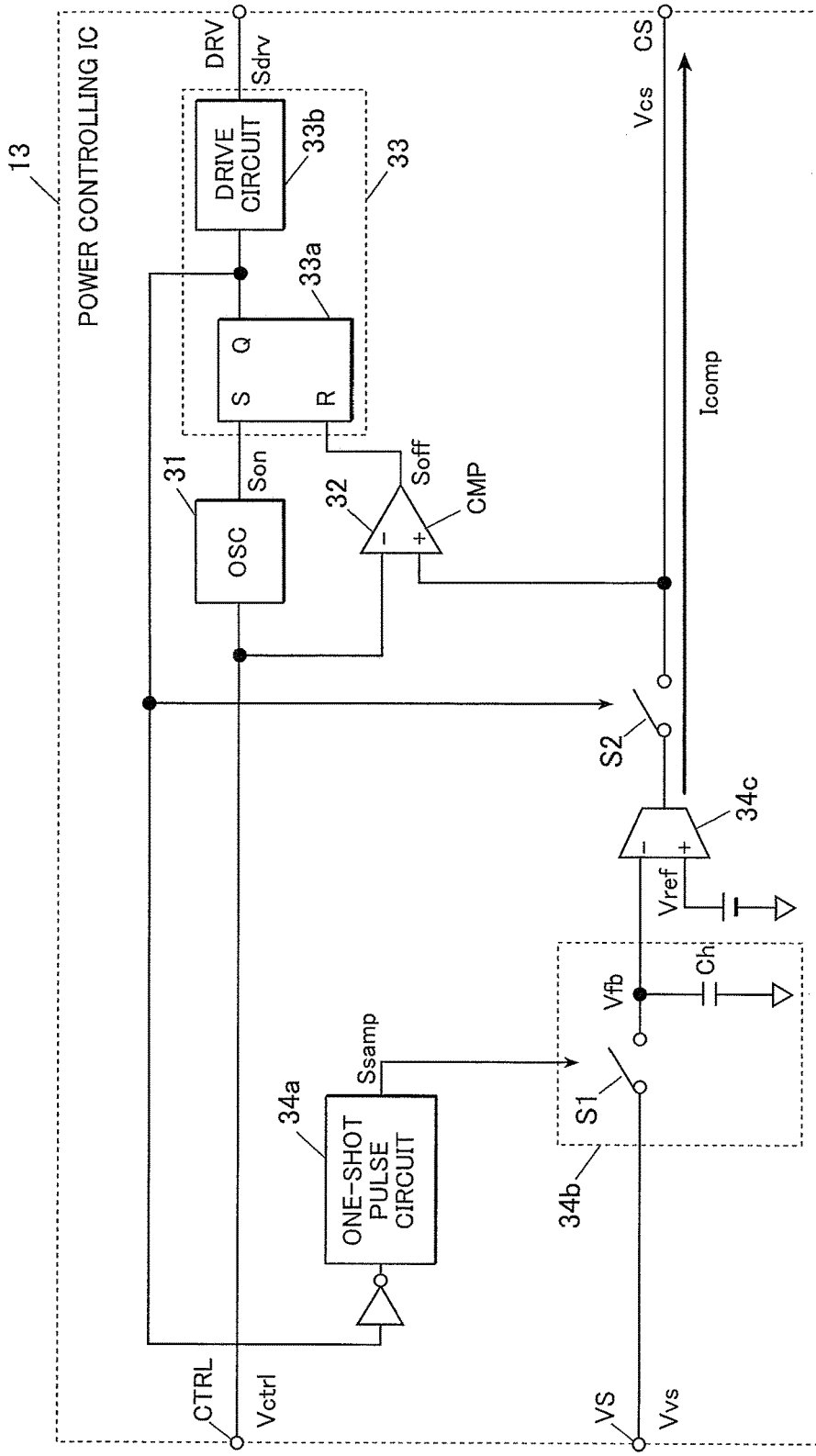
FIG. 15 illustrates a specific circuit configuration of the power controlling IC according to the second embodiment.

In FIGS. 4, 8, and 15, the voltage Vcs at the current detecting terminal CS is directly applied to the voltage comparing circuit CMP. Alternatively, the applied voltage may preliminarily amplified by an amplifier (not shown) or shifted by a level shifter.

In FIGS. 4 and 8, the control voltage Vctrl at the control terminal CTRL is applied to the minimum selecting circuit 35b. In FIG. 15, the control voltage Vctrl is directly applied to the voltage comparing circuit CMP. Alternatively, a voltage at a buffer (not shown), a voltage amplified or divided from a voltage at the control terminal, or a voltage of a slope compensating circuit for prevention of subharmonic oscillation may be applied.

The drive pulse generator 33 includes, for example, a RS flip-flop 33a to be set by the turning-on signal Son generated by the turning-on signal generator 31 and reset by the turning-off signal Soff generated by the turning-off signal generator 32; and a drive circuit or driver 33b having a low output impedance that generates gate drive pulses Sdry for the switching transistor SW connected to the terminal DRV in response to an output from the flip-flop 33a.

The correction current generator 34 includes, for example, a one-shot pulse generating circuit 34a detecting a rise or fall in the output from the flip-flop 33a and generating a sampling signal Ssamp; a sample holding circuit 34b including a switch S1 to be turned on or off by the sampling signal Ssamp and a capacitor Ch to sample the voltage Vvs at the voltage detection terminal VS; a voltage-current converting circuit 34c converting the sampled voltage into a current; and a switch S2 to be turned on or off by the output from the flip-flop 33a in a manner complementary to the switch S1 to apply the output current from the voltage-current converting circuit 34c to the current detecting terminal CS. The voltage-current converting circuit 34c may include, for example, a transconductance (gm) amplifier receiving the sampled voltage and a reference voltage Vref to generate a current corresponding to the difference in potential between the voltages.

Figure 3B:
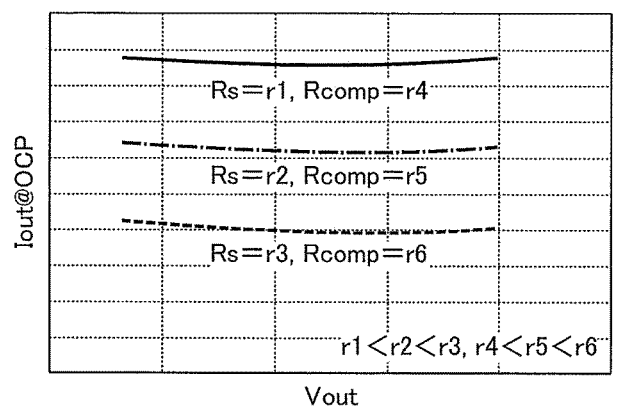
FIG. 3B is a graph indicating the shift of the characteristic curve of the output overcurrent limit versus the output voltage during the overcurrent protective operation after variations of resistances of the correction resistor and a current detecting resistor of the AC-DC converter including the power controlling IC according to the first embodiment.
Figure 3C:
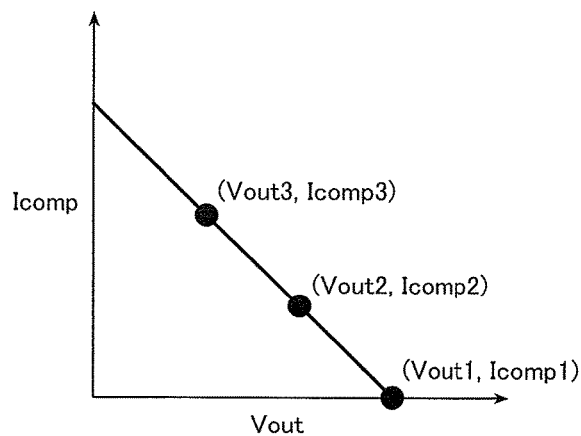
FIG. 3C is a graph indicating the relation between the output voltage and a correction current in the power controlling IC according to the first embodiment.

As described above, the voltage Vvs at the voltage detection terminal VS receiving the voltage divided from the induced voltage in the auxiliary winding is proportional to the sum of the output voltage Vout at the secondary side and the forward voltage VF at the diode D2. The output voltage Vout at the secondary side is shifted in response to a switching instruction from the load device. As illustrated in FIG. 3C, the voltage-current converting circuit 34c can generate a larger correction current Icomp as the output voltage Vout decreases or a smaller correction current Icomp as the output voltage Vout increases where the generated correction current Icomp is applied to the current detecting terminal CS.

In the power controlling IC 13 according to the embodiment in FIG. 4, the overcurrent limiting voltage Vocp has a fixed value. Alternatively, the overcurrent limiting voltage Vocp may have a value associated with input voltage Vin, a value associated with an ON-time of the switching transistor, or a value associated with the on-duty ratio of the drive pulse of the switching transistor SW. In this embodiment, the current in the primary side winding is detected by the resistor Rs. Alternatively, the current may be detected by an on-resistance of the switching transistor SW, in other words, the voltage between the source and drain of the switching transistor SW.

In this embodiment, the turning-on signal Son indicating the timing for turning on the switching transistor SW is generated in the oscillating circuit OCS at a predetermined frequency. Alternatively, the turning-on signal Son may be generated in response to the detection of the time when the current through the transformer 12 is zero; when the current through the transformer 12 is zero and when the voltage between the source and the drain of the switching transistor SW are zero; or when the resonant voltage at the switching transistor SW is dropped to an undetectable level.

The state of "the current through the transformer 12 is zero" may be detected by the current through the secondary side winding, the voltage converted from the current through the secondary side winding, the switching transistor SW that is in OFF-state to completely demagnetize the transformer 12 and generates an oscillating voltage, or the oscillation of the voltage at the secondary side winding or the auxiliary winding at the primary side. The turning-on signal Son may be generated in response to such detection.

Figure 5:
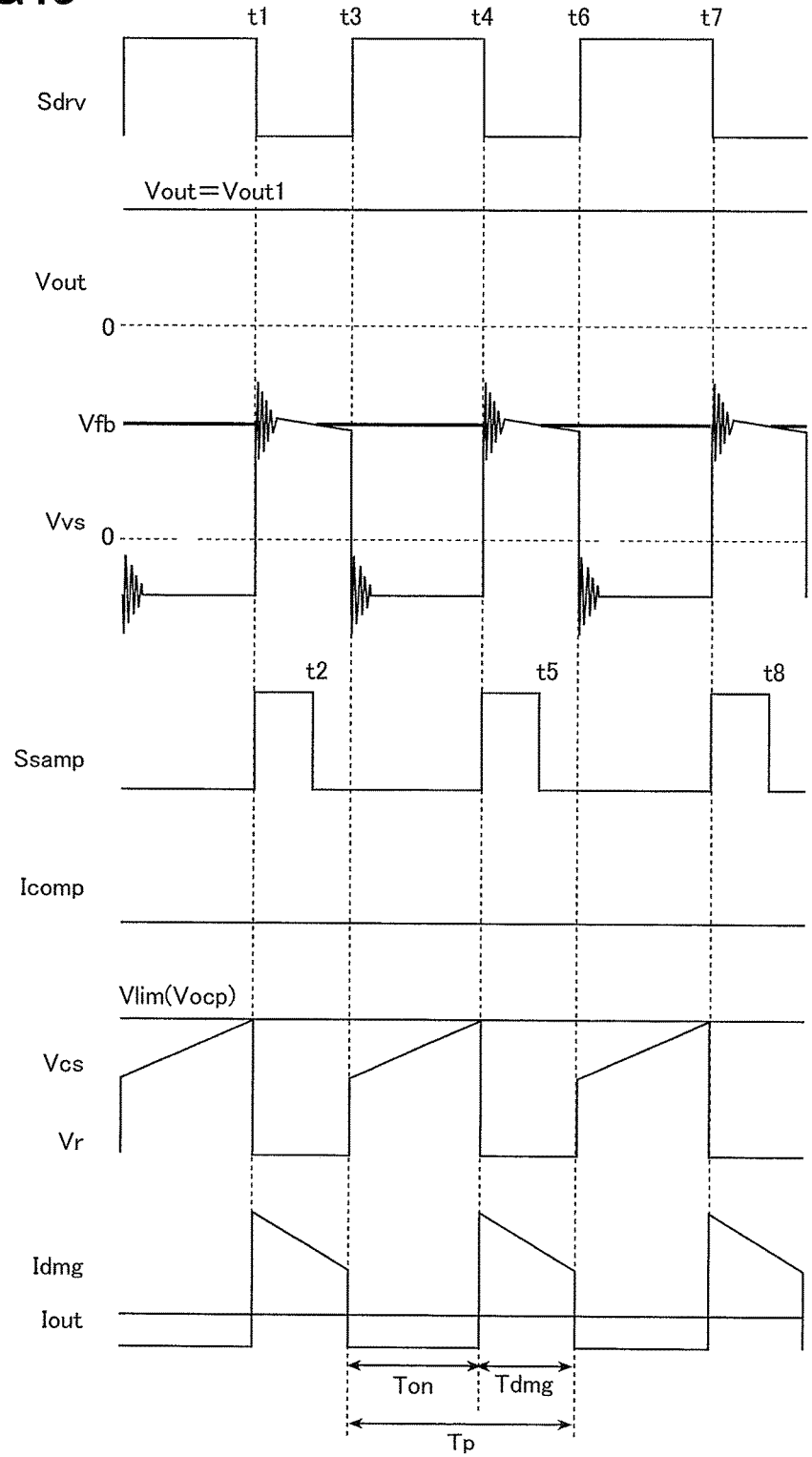
FIG. 5 illustrates waveforms indicating a variation in voltage or current at each component of the power controlling IC after the output voltage is adjusted to a high level in the first embodiment.
Figure 6:
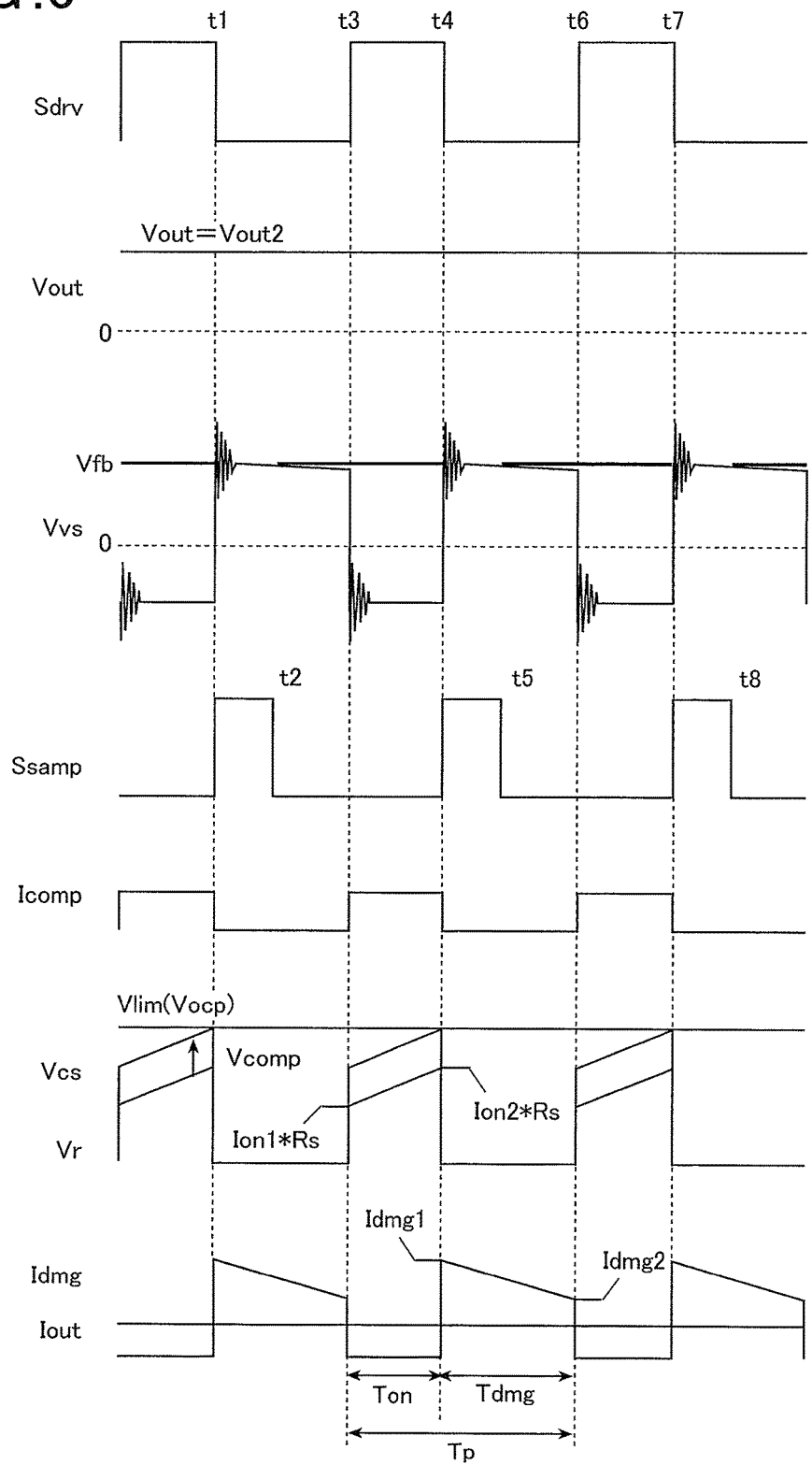
FIG. 6 illustrates waveforms indicating a variation in voltage or current at each component of the power controlling IC after the output voltage is adjusted to a medium level in the first embodiment.
Figure 7:
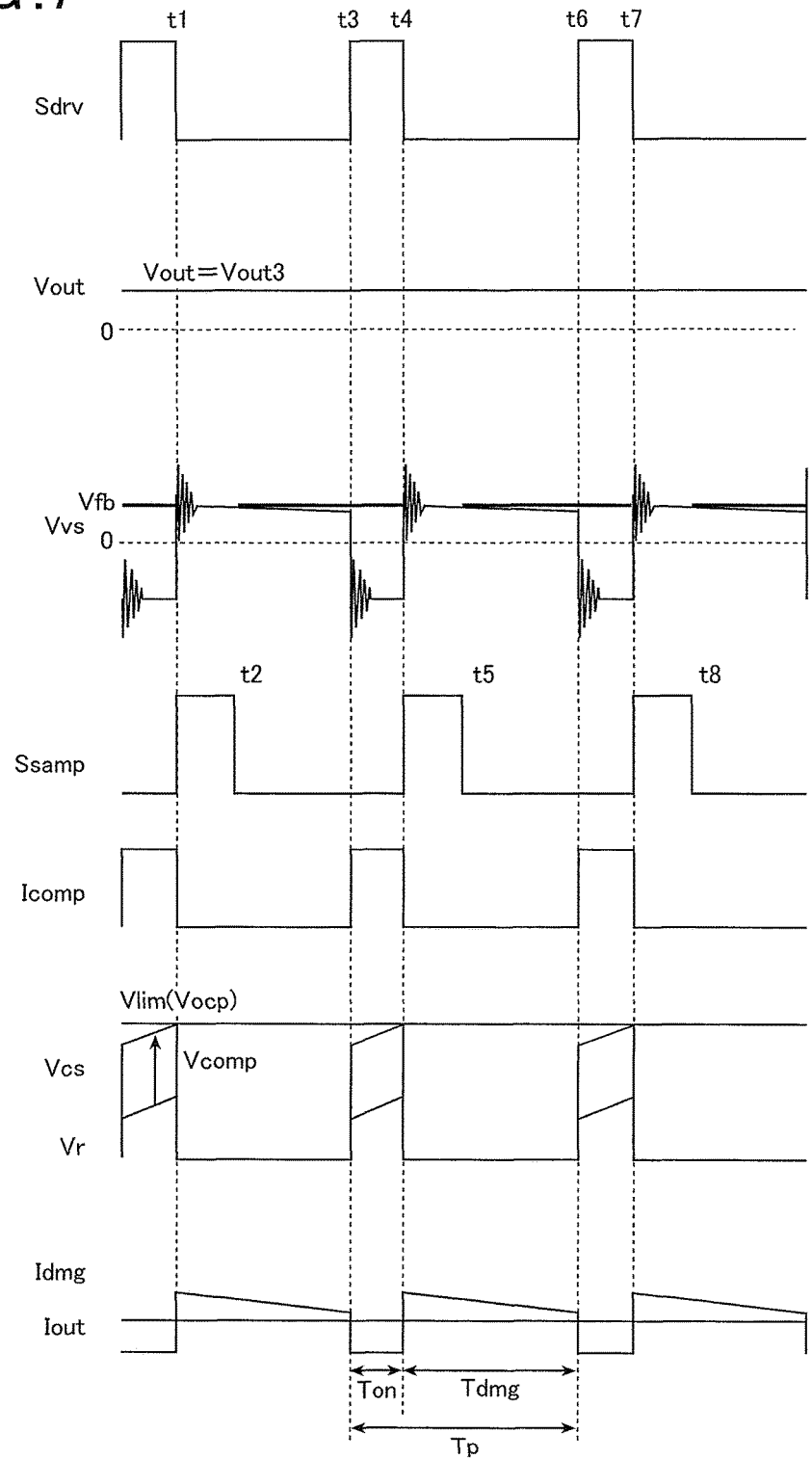
FIG. 7 illustrates waveforms indicating a variation in voltage or current at each component of the power controlling IC after the output voltage is adjusted to a low level in the first embodiment.

The overcurrent protecting operation of the power controlling IC 13 in FIG. 4 after a shift of the output voltage Vout will now be described with reference to timing charts in FIGS. 5 to 7. FIGS. 5, 6, and 7 indicate operational timings at the output voltage Vout equaling Vout 1, Vout 2, and Vout 3, respectively, where Vout 1>Vout 2>Vout 3. Vfb represents a voltage sampled by the sample holding circuit 34b. Idmg represents a shift in current through the secondary side winding of the transformer 12 during a demagnetization period. The waveforms indicating a shift of the voltage Vcs at the current detecting terminal CS in FIGS. 5 to 7 demonstrate that the voltage Vcs reaching the voltage Vlim shifts the drive pulse Sdry to a low level. Thus, the switching transistor SW is turned off.

As illustrated in FIGS. 5 to 7, the overcurrent protecting function of the power controlling IC 13 causes the voltage Vcs at the current detecting terminal CS to reach the upper limit current detecting voltage Vlim (Vocp) and causes the gate drive pulse Sdry to shift from a high level to a low level at times t1, t4, and t7, at which the switching transistor SW is turned off. Thus, the voltage induced in the auxiliary winding rises, resulting in a rise in the voltage Vvs at the voltage detection terminal VS. At times t1, t4, and t7, the sampling signal Ssamp shifts to a high level, which turns on the switch S1 of the sample holding circuit 34b and charges the capacitor Ch. The shift of the sampling signal Ssamp to a low level at times t2, t5, and t8 causes the switch S1 to be turned off. The voltage Vvs at the terminal VS at any of the times is held in capacitor Ch of the sample holding circuit 34b as a voltage Vfb. The voltage-current converting circuit 34c then generates a correction current Icomp inversely proportional to the held voltage Vfb. The correction current Icomp is thereby applied to the current detecting terminal CS.

Since Vout 1>Vout 2>Vout 3, the correction current Icomp in FIG. 6 or 7 is higher than that in FIG. 5. Thus, the voltage Vcomp raised by the correction current Icomp is also higher than that in FIG. 5. As demonstrated in FIGS. 6 and 7, the shift of the gate drive pulse Sdry to a high level at times t3 and t6 causes the switching transistor SW to be turned on and the current to pass through the primary side winding. During a period Ton where the voltage Vcs at the current detecting terminal CS rises, the voltage Vcs reaches the upper limit current detecting voltage Vlim at a low current through the primary side winding compared to the case where the correction current Icomp is not applied. During a normal operation at a low output current, the voltage Vcs at the current detecting terminal CS reaching the control voltage Vctrl at the control terminal CTRL instead of the overcurrent limiting voltage Vocp causes the switching transistor SW to be turned off.

As a result, the current Idmg passing through the secondary side winding during the demagnetization period decreases. As the low output voltage Vout decreases, the apparent overcurrent limiting voltage for the overcurrent protection decreases. A variation in the resistance of the correction resistor Rcomp connected to the current detecting terminal CS can vary the voltage Vcomp raised by the correction current Icomp. As illustrated in FIG. 3A, the slope of the characteristic curve of the output overcurrent limit in the overcurrent protective operation versus the output voltage can be freely determined. The current detecting resistor Rs connected to the current detecting terminal CS has a different resistance from the correction resistor Rcomp. Thus, the characteristic curve of the output overcurrent limit versus the output voltage can be shifted as illustrated in FIG. 3B.

A specific scheme of determination of the characteristics of the output overcurrent limit versus the output voltage during the overcurrent protective operation of the power controlling IC 13 according to the present embodiment will now be described.

In the embodiment of FIG. 4, an output current Iout from the power controlling IC 13 of the switched-mode power supply in FIG. 1 can be represented by Expression (i):

$$Iout = (Idmg1 + Idmg2) \times 0.5 \times Tdmg/Tp \quad (i)$$

where Tp represents the switching cycle and Tdmg represents the demagnetization period. The output current Iout is a time-averaged currents flowing through the secondary side winding of the transformer during the demagnetization period.

The cycle Tp is the inverse of a frequency Fsw to be determined by the turning-on signal generator 31, i.e., Tp=1/Fsw. The relation between a demagnetized current Idmg1 and an ON-state current Ion2 at the switching transistor SW after turning-off of the switching transistor SW is represented by Expression (ii):

$$Idmg1 = N1/N2 \times Ion2 \quad (ii)$$

The relation is proportional and is determined by the ratio N1/N2 of windings of the primary side winding N1 to that of the secondary side winding N2.

The relation between a demagnetized current Idmg2 and the ON-state current Ion 1 at the switching transistor SW after turning-on of the switching transistor SW is represented by Expression (iii):

$$Idmg2 = N1/N2 \times Ion1 \quad (iii)$$

This relation is also proportional and is determined by the ratio N1/N2 of windings of the primary side winding N1 to that of the secondary side winding N2.

The demagnetized current Idmg2 is represented by Expression (iv):

$$Idmg2 = Idmg1 - (Vout + VF)/L2 \times Tdmg \quad (iv)$$

The demagnetized current Idmg2 decreases from the demagnetized current Idmg1 by the value determined by the output voltage Vout, the forward voltage VF at the diode D2, an inductance L2 at the secondary side of the transformer, and the demagnetization period Tdmg.

The ON-state current Ion2 is represented by Expression (v):

$$Ion2 = Ion1 + (Vin/L1) \times Ton \quad (v)$$

The ON-state current Ion2 increases from the ON-state current Ion 1 by the value determined by the input voltage Vin, an inductance L1 at the primary side of the transformer, and an ON-time Ton.

The ON-state current Ion2 is represented by Expression (vi):

$$Ion2 = (Vlim - Icomp \times Rcomp)/Rs \quad (vi)$$

The ON-state current Ion2 is determined by the upper limit current detecting voltage Vlim, the correction current Icomp, the resistance of the correction resistor Rcomp, and the resistance of the current detecting resistor Rs.

The deformed expressions (i) to (vi) give Expression (vii):

$$Iout = \{(Vlim - Icomp \times R2)/R1 \times N1/N2 - (0.5 \times (Vout + VF))/(L2 \times Fsw) \times (1 - (Vout + VF)/Vin \times N1/N2)\} \times (1 - (Vout + VF)/Vin \times N1/N2) \quad (vii)$$

Expression (vii) indicates the output current Iout as a function of the output voltage Vout, the correction current Icomp, the resistance of the correction resistor Rcomp, and the resistance of the current detecting resistor Rs. In the overcurrent state of the extremely high output current Iout, the overcurrent protecting function controls such that the upper limit current detecting voltage Vlim does not exceed the overcurrent limiting voltage Vocp. The output current Iout is limited by the output overcurrent limit. Thus, a variation in the correction current Icomp in response to the voltage Vvs at the voltage detection terminal VS or the output voltage Vout and the adjustment of the resistances of the correction resistor Rcomp and the current detecting resistor Rs can freely determine the characteristics of the output overcurrent limit versus the output voltage during the overcurrent protective operation.

In designing of a switched-mode power supply including a power controlling IC 13 having the configuration described above to determine desired characteristics of an output overcurrent limit versus an output voltage, the number of windings of the auxiliary winding Nb and the resistances of the resistors R11 and R12 are determined such that the voltage Vvs is applied to the voltage detection terminal VS. As a result, the correction current at a first output voltage has a first value and the correction current at a second output voltage has a second value. The first and second current limits for the switching device are then determined such that the output current in the secondary side of the transformer has a first output overcurrent limit at the first output voltage or a second output overcurrent limit at the second output voltage. In the case that the first and second output voltages and the upper limit current detecting voltage serves as overcurrent limiting voltages, the resistance of a current-voltage converting resistor connected to the current detecting terminal and the resistance of the correction resistor are determined such that the resistances serve as the first and second current limits.

A variation in the power controlling IC 13 according to the first embodiment will now be described with reference to FIGS. 8 to 12.

This variation differs from the embodiment described above in that the turning-on signal generator 31 includes an oscillating circuit OSC capable of varying its frequency, in that the frequency varies in response to the control voltage Vctrl applied to the control terminal CTRL for generation of the turning-on signal Son, and in that the correction current generator 34 generates a correction current Icomp corresponding to the voltage Vvs at the voltage detection terminal VS and the control voltage Vctrl at the control terminal CTRL.

As illustrated by solid lines A in FIG. 10A, the oscillating circuit OSC capable of varying the frequency generates the turning-on signal Son at a low frequency Fsw, for example, 20 kHz in an area of a low output voltage Vout where the control voltage Vctrl at the control terminal CTRL is, for example, 1.5 V or less. The oscillating circuit OSC generates the turning-on signal Son at a high frequency Fsw, for example 65 kHz in an area of a high output voltage Vout where the control voltage Vctrl is, for example, higher than 1.7 V.

Switched-mode power supplies, as shown in the embodiment of FIG. 2, are often designed to have an enhanced power conversion efficiency at a switching frequency lower than that at a peak power output such that the power conversion efficiency increases as the output power (the product of the output voltage and the output current) decreases relative to the peak power output (the largest product of an output voltage and an output current selected from multiple combinations of rated output voltages and rated output currents). The reduced frequency Fsw of the oscillating circuit OSC in the area of the low output voltage Vout can thereby enhance the power conversion efficiency in that area compared to the same frequency both in the area with the high output voltage Vout and in the area with the low output voltage Vout.

A variation in the frequency Fsw of the oscillating circuit OSC without the correction current generator 34 in response to the control voltage Vctrl at the control terminal CTRL produces a large shift in the output current during the overcurrent protective operation in response to the output voltage, resulting in a maximum difference of, for example, 3 A or more. The oscillating circuit OSC with the correction current generator 34 can raise the voltage Vcs at the current detecting terminal CS, resulting in a small shift in the output current during the overcurrent protective operation, for example a maximum difference of 0.2 A or less.

In this variation, the control voltage Vctrl at the control terminal CTRL is applied to the minimum selecting circuit 35b. As illustrated by dotted lines B in FIG. 10A, the minimum selecting circuit 35b proportionally shifts the upper limit current detecting voltage Vlim to the control voltage Vctrl at the control terminal CTRL, for example, by a factor of 0.208 in a normal operational area Ta where the output current Iout is lower than an output overcurrent limit Iocp. If the voltage, which is proportional to the control voltage Vctrl, for example, by a factor of 0.208, exceeds the overcurrent limiting voltage Vocp and reaches, for example, 0.52 V, the minimum selecting circuit 35b can keep the upper limit current detecting voltage Vlim constant or equal to Vocp such that the overcurrent protecting function works, as illustrated in an operational area Tb.

Figure 9A:
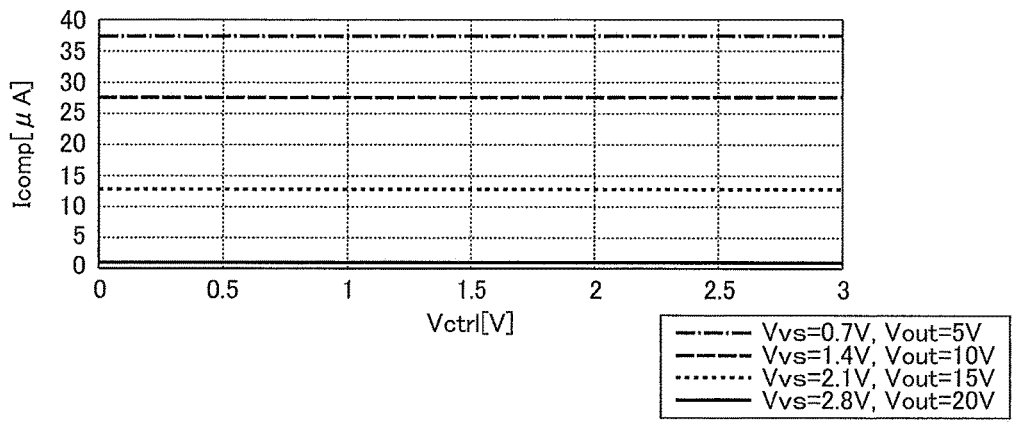
FIG. 9A is a graph indicating characteristic curves of the correction current versus the control voltage at a correction current generator according to an implementation of the first embodiment.
Figure 9B:
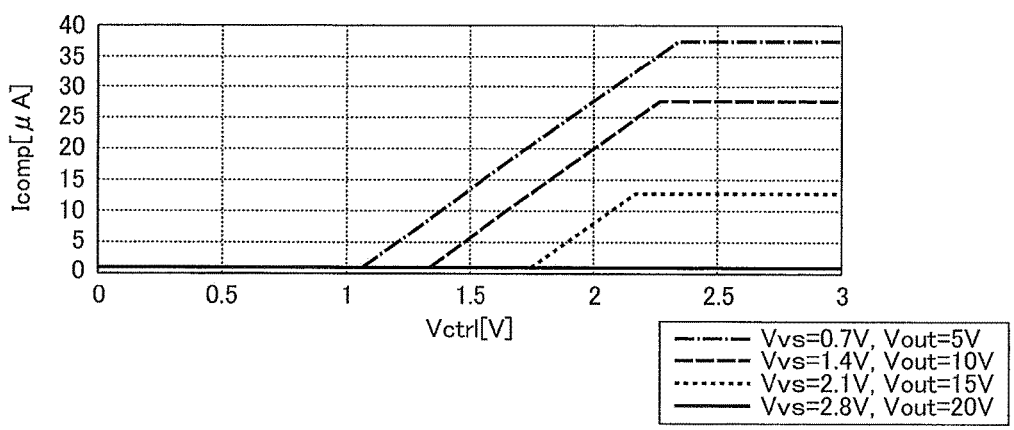
FIG. 9B is a graph indicating the characteristic curves of the correction current versus the control voltage at the correction current generator according to the variation.

The correction current generator 34 according to the embodiment in FIG. 3 can generate a constant correction current Icomp regardless of the control voltage Vctrl applied to the control terminal CTRL as illustrated in FIG. 9A. The correction current generator 34 according to the present variation can generate a correction current Icomp corresponding to the control voltage Vctrl at the control terminal CTRL as illustrated in FIG. 9B.

Figure 9C:
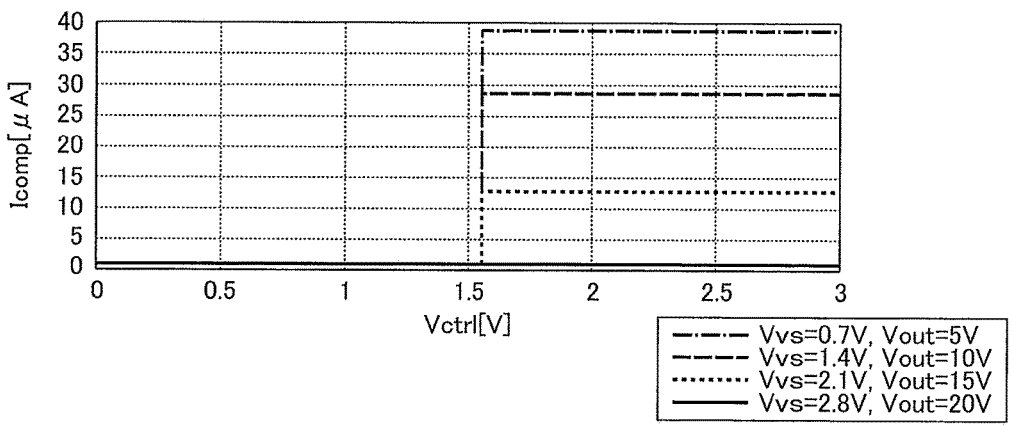
FIG. 9C is a graph indicating other exemplary characteristic curves of the correction current versus the control voltage at the correction current generator according to the variation.

In response to switching of the output voltage Vout to Vout 1, Vout 2, Vout 3, or Vout 4 (Vout 1>Vout 2>Vout 3>Vout 4), the correction current generator 34 can generate the correction current Icomp according to different characteristic curves of the correction current corresponding to the output voltage versus the control voltage or the characteristics of Icomp versus Vctrl. As illustrated in FIG. 9C, the correction current generator 34 may be designed to vary the characteristic curves of the correction current versus the control voltage in a stepwise manner at a predetermined voltage (about 1.5 V in the drawing).

The power supply according to the embodiment in FIG. 2 varies the level of the correction current Icomp according to the voltage Vvs at the voltage detection terminal VS but keeps the control voltage Vctrl at the control terminal CTRL constant (see FIG. 9A). As indicated by the characteristics of the switching frequency versus the output current Iout in FIG. 11A, the switching frequency is high at, for example, a current Iout of 1 A and Vout of 5 V compared to a current Iout of 1 A and a voltage Vout of 20 V. The correction current generator 34 of the power supply according to this variation alters the level of the correction current Icomp through the correction resistor Rcomp also relative to the control voltage Vctrl. As indicated by the characteristic curve of the switching frequency versus the output current Iout in FIG. 11B, the switching frequency is low at, for example, a current Iout of 1 A and a voltage Vout of 5 V compared to Iout of 1 A and Vout of 20 V. As a result, the power supply having a desired output overcurrent limit advantageously has a high degree of freedom in design and can achieve high power conversion efficiency at a low output voltage.

Figure 12:
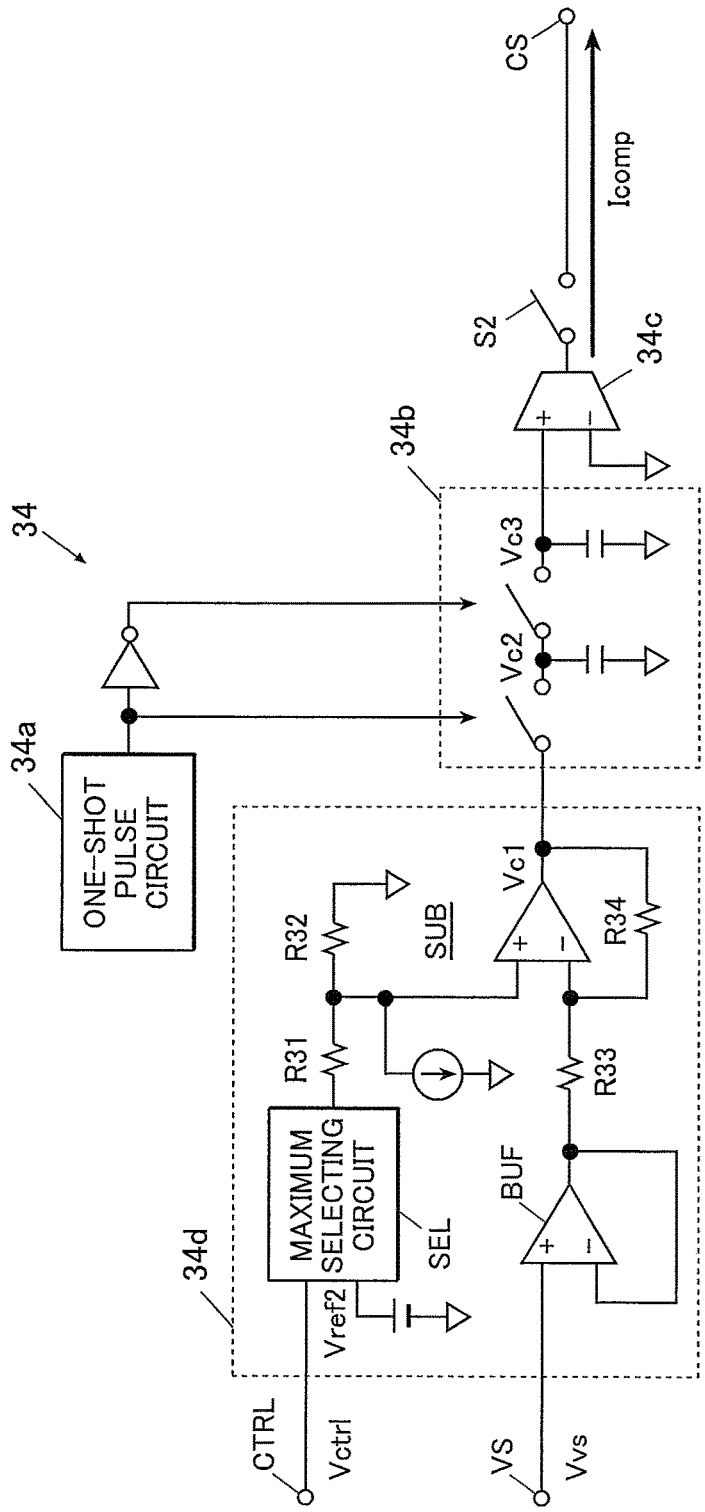
FIG. 12 illustrates a circuit configuration of an exemplary correction current generator according to the variation in the power controlling IC of the first embodiment.

FIG. 12 illustrates a specific correction current generator 34 according to the present variation generating a correction current Icomp corresponding to the voltage Vvs at the voltage detection terminal VS and the control voltage Vctrl at the control terminal CTRL.

As illustrated in FIG. 12, the correction current generator 34 includes an arithmetic circuit 34d receiving the voltage Vvs at the voltage detection terminal VS and the control voltage Vctrl at the control terminal CTRL. The voltage-current converting circuit 34c can convert the output voltage at the arithmetic circuit 34d to a current and generate a correction current Icomp corresponding to the voltage Vvs at the voltage detection terminal VS and the voltage Vctrl at the control terminal CTRL. The sample holding circuit 34b is disposed between the arithmetic circuit 34d and the voltage-current converting circuit 34c and includes two sets of sampling switches and capacitors to serve as low-pass filters. It should be noted that the sample holding circuit 34b may be disposed at the preceding stage of the arithmetic circuit 34d.

The arithmetic circuit 34d includes a maximum selecting circuit SEL selecting the higher one of the control voltage Vctrl at the control terminal CTRL and a predetermined reference voltage Vref2; resistors R31 and R32 dividing the output voltage at the maximum selecting circuit SEL; a voltage follower BUF converting the input having the voltage Vvs at the voltage detection terminal VS into an impedance-matched output; and a subtracting circuit SUB receiving the voltage divided from the output voltage at the maximum selecting circuit SEL and the output voltage at the voltage follower BUF. The voltage-current converting circuit 34c generates a correction current Icomp corresponding to the difference in potential between the voltage Vctrl at the control terminal CTRL and the voltage Vvs at the voltage detection terminal VS.

Second Embodiment

A second embodiment of the switched-mode power supply according to the present invention will now be described.

Figure 13:
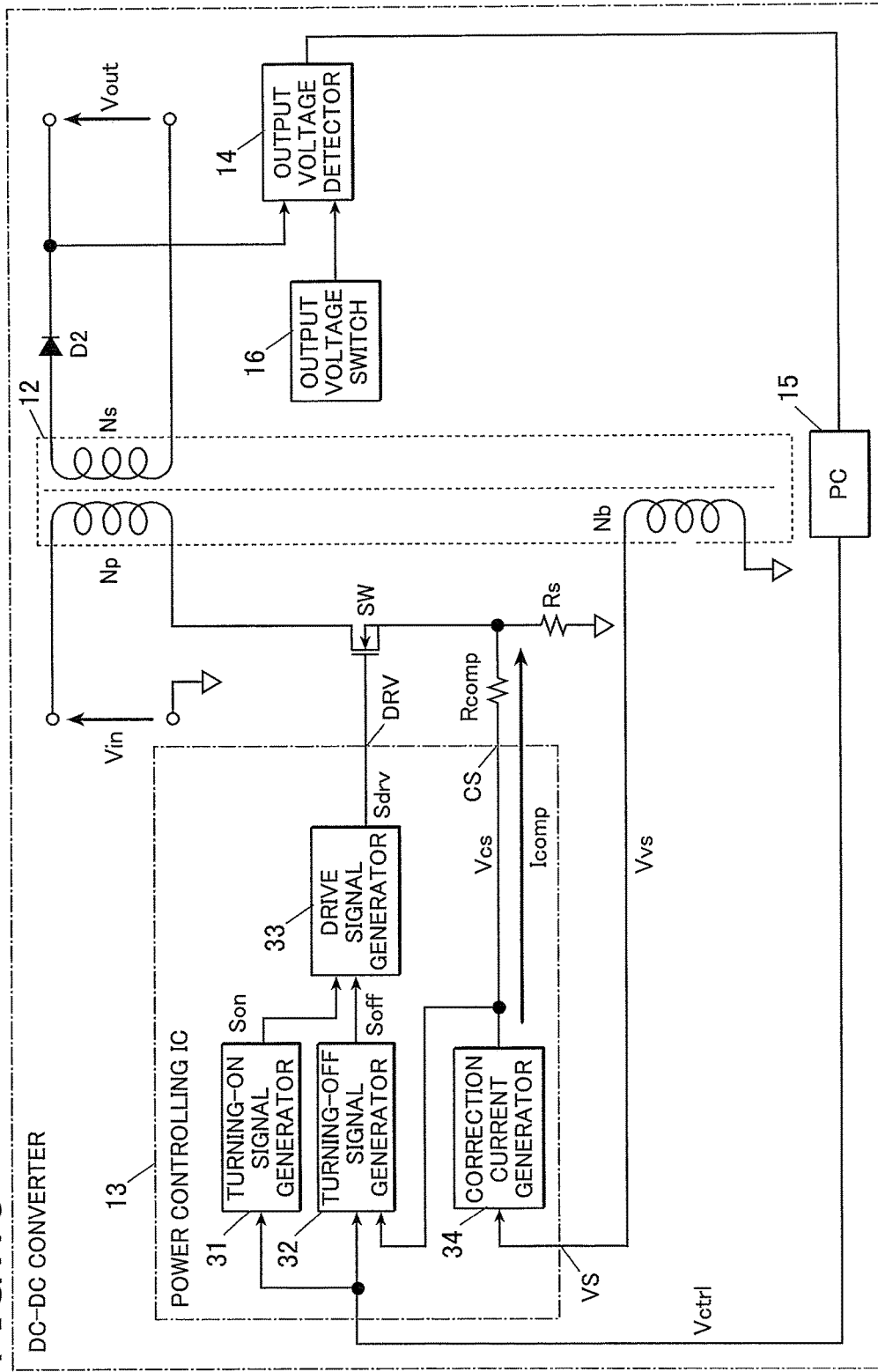
FIG. 13 is a block diagram of a power controlling IC according to a second embodiment.

FIG. 13 illustrates a circuit configuration of a switched-mode power supply or a DC-DC converter according to the second embodiment.

The switched-mode power supply according to the second embodiment can switch the output voltage in response to a request from a device at the load and freely determine the relation between the output voltage and an output ripple. Like the first embodiment in FIG. 2, the switched-mode power supply includes a correction current generator 34 generating a correction current Icomp corresponding to the voltage at a voltage detection terminal VS and applying the correction current Icomp to a current detecting terminal CS; and a correction resistor Rcomp connected to a current detecting terminal CS.

The power controlling IC 13 in the second embodiment has two major differences from that in the first embodiment in FIG. 2.

The first difference is that the power controlling IC 13 in the first embodiment applies the upper limit current detecting voltage Vlim to the turning-off signal generator 32 generating the turning-off signal Soft whereas the power controlling IC 13 in the second embodiment applies the control voltage Vctrl at the control terminal CTRL to the turning-off signal generator 32.

The second difference is that the turning-on signal generator 31 of the power controlling IC 13 in the first embodiment generates the turning-on signal Son indicating the timing for turning on the switching transistor SW at a predetermined frequency whereas the turning-on signal generator 31 of the power controlling IC 13 in the second embodiment generates the turning-on signal Son at the frequency corresponding to the control voltage Vctrl at the control terminal CTRL.

The operation of the power controlling IC 13 after variations in resistances of the correction resistor Rcomp and the current detecting resistor Rs according to the second embodiment will now be explained.

As described above, the output voltage shifted to a low level generates a low switching frequency in a traditional switched-mode power supply as disclosed in JP 2017-127109A, resulting in a high output ripple.

In the second embodiment, the correction current Icomp generated by the correction current generator 34 is applied to the correction resistor Rcomp and raises the voltage at the current detecting terminal CS like the first embodiment. As the correction current Icomp increases, the current detecting voltage Vcs rises. The time for generation of the turning-off signal Soff can be advanced compared to the power controlling IC 13 without the correction resistor Rcomp and the correction current generator 34. Therefore, if the output voltage is low, the correction current Icomp is increased. This can prevent the switching frequency from decreasing after selection of a low output voltage and prevent the output ripple from increasing.

Figure 14A:
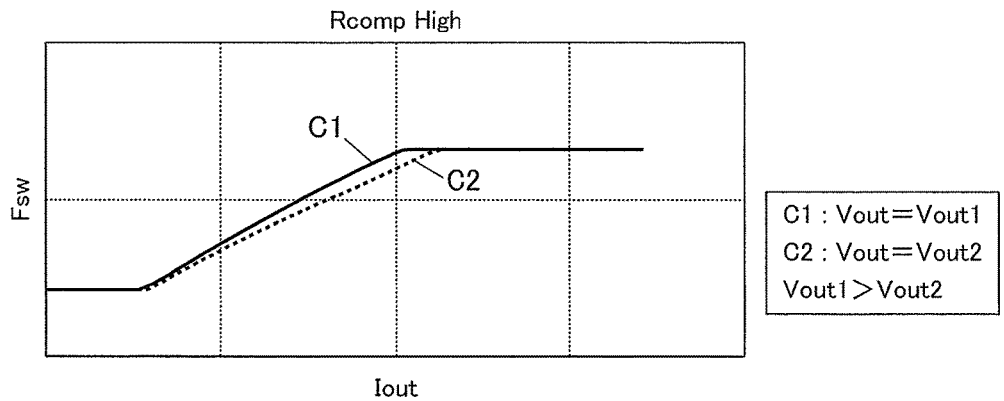
FIG. 14A is a graph indicating a shift of a characteristic curve of the switching frequency versus the output current in the case that the correction resistor has a high resistance in the AC-DC converter including the power controlling IC according to the second embodiment.
Figure 14B:
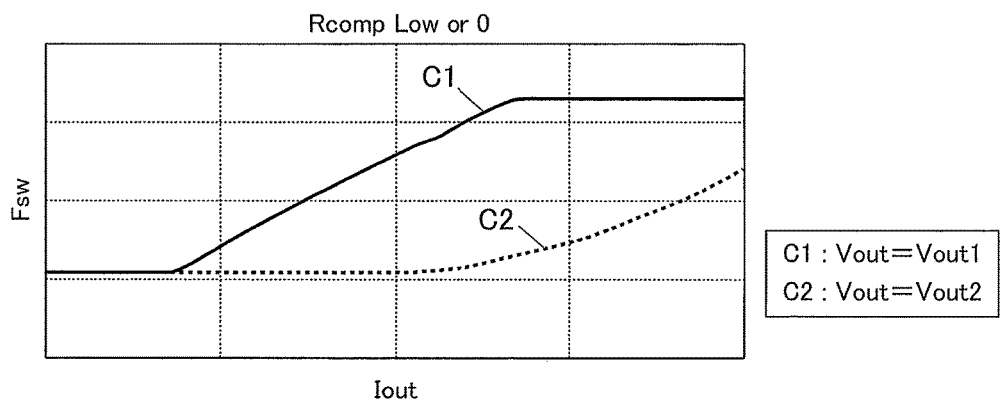
FIG. 14B is a graph indicating a shift of the characteristic curve of the switching frequency versus the output current in the case that the correction resistor has a low resistance in the AC-DC converter including the power controlling IC according to the second embodiment.

FIG. 14A indicates a characteristic curve of the switching frequency and output current after connection of the correction resistor Rcomp or determination of a high resistance of the correction resistor Rcomp. FIG. 14B indicates a characteristic curve of the switching frequency versus the output current without connection of the correction resistor Rcomp or after determination of a low resistance of the correction resistor Rcomp to vary the output voltage.

In each of FIGS. 14A and 14B, a solid line C1 represents the characteristic curve at the output voltage equal to Vout 1 and a dotted line C2 the characteristic curve at the output voltage equal to Vout 2, where Vout 1>Vout 2. In the absence of the correction resistor Rcomp or at a low resistance of the correction resistor Rcomp, the increasing output voltage Vout 2 cannot readily increase the switching frequency Fsw despite an increase in the output current Iout, as indicated by the characteristic curve C2 in FIG. 14B.

In contrast, as the output current Iout increases both at the high and low output voltages as indicated by the characteristic curve C2 in FIG. 14A, a high resistance of the correction resistor Rcomp increases the switching frequency Fsw. As a result, selection of a low output voltage does not generate a high output ripple. Furthermore, a variation in the resistance of the external correction resistor Rcomp can shift the characteristic curve C2 in FIG. 14A.

In this manner, the switched-mode power supply according to the second embodiment can freely determine the relation between the output voltage and the output ripple. The output ripple can be also adjusted by the switching frequency or the frequency of the oscillating circuit. As the frequency increases, the output ripple can decrease. At the same time, a high frequency is likely to lower the power conversion efficiency in general. Thus, the frequency of the oscillating circuit should be determined in view of the trade-off relation between the output ripple and the power conversion efficiency.

FIG. 15 illustrates a specific circuit configuration of the power controlling IC 13 in FIG. 13.

As illustrated in FIG. 15, the power controlling IC 13 according to this embodiment includes a turning-on signal generator 31 generating the turning-on signal Son and including an oscillating circuit OSC that varies the frequency according to the control voltage Vctrl at the control terminal CTRL. The oscillating circuit OSC may operate at a constant frequency.

The turning-off signal generator 32 generating the turning-off signal Soff includes a voltage comparing circuit CMP comparing the control voltage Vctrl at the control terminal CTRL with the voltage Vcs at the current detecting terminal CS. Like the first embodiment in FIG. 4, the turning-off signal generator 32 may include an overcurrent limiting voltage generator 35a generating the overcurrent limiting voltage Vocp; a minimum selecting circuit 35b selecting the lower one of the overcurrent limiting voltage Vocp and the control voltage Vctrl at the control terminal CTRL as the upper limit current detecting voltage Vlim; and a voltage comparing circuit CMP comparing the upper limit current detecting voltage Vlim (Vocp or Vctrl) with the voltage Vcs at the current detecting terminal CS.

The drive pulse generator 33 and the correction current generator 34 have the same configurations as those in the first embodiment in FIG. 4 and are not described.

Figure 14C:
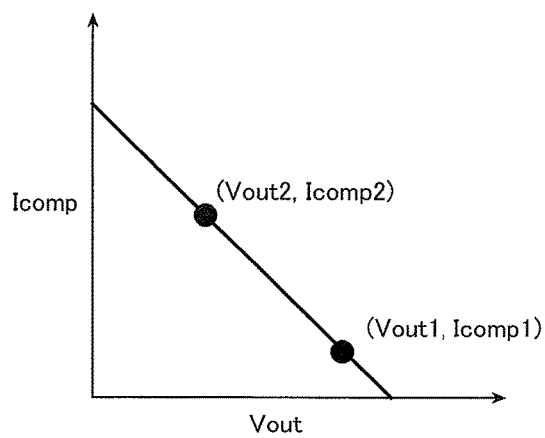
FIG. 14C is a graph indicating the relation between the output voltage and the correction current in the power controlling IC according to the second embodiment.

Also in this embodiment, the output voltage Vout at the secondary side can vary in response to a switching instruction from a load device. As illustrated in FIG. 14C, the voltage-current converting circuit 34c of the correction current generator 34 can generate an larger correction current Icomp as the output voltage Vout decreases or a smaller correction current Icomp as the output voltage Vout increases where the generated correction current Icomp is applied to the current detecting terminal CS.

The power controlling IC 13 according to the embodiment in FIG. 15 generates the turning-on signal Son indicating the timing for turning on the switching transistor SW in the oscillating circuit OSC at a frequency variable according to the control voltage Vctrl at the control terminal CTRL. Alternatively the power controlling IC 13 may generate a turning-on signal Son in response to the detection of the time when the current through the transformer 12 is zero; the time when the current through the transformer 12 is zero and when the voltage between the source and the drain of the switching transistor SW is zero; or when the oscillating voltage at the switching transistor SW is dropped to an undetectable level, with the proviso that a time corresponding to the control voltage Vctrl at the control terminal CTRL elapses.

The state of "the current through the transformer 12 is zero" may be detected by the current through the secondary side winding, the voltage converted from the current through the secondary side winding, the switching transistor SW that is in OFF-state to completely demagnetize the transformer 12 and generates an oscillating voltage, or the oscillation of the voltage at the secondary side winding or the auxiliary winding at the primary side. The turning-on signal Son may be generated in response to such detection.

Figure 16:
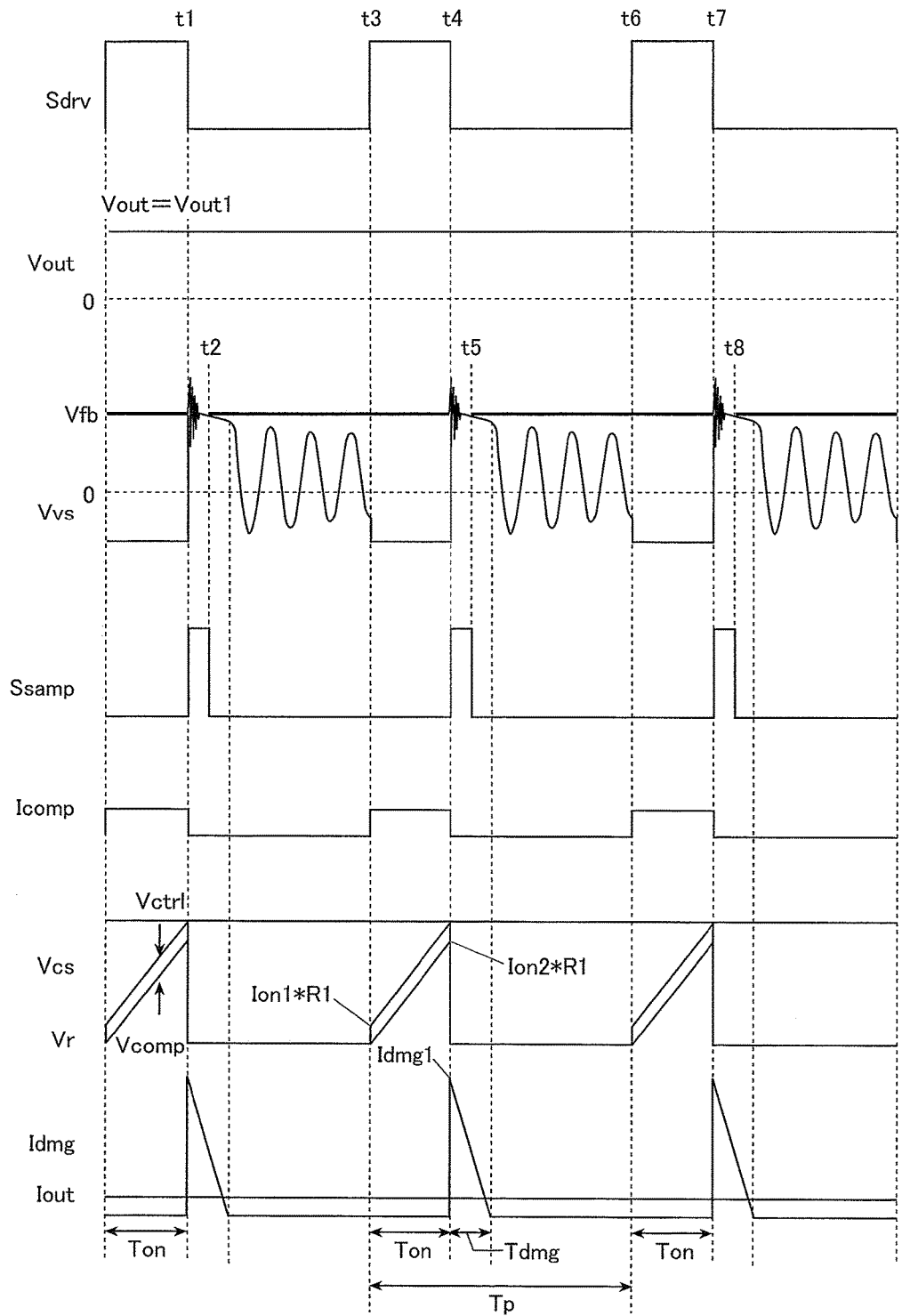
FIG. 16 illustrates waveforms indicating a variation in voltage at each component of the power controlling IC after the output voltage is adjusted to a high level according to the second embodiment.
Figure 17:
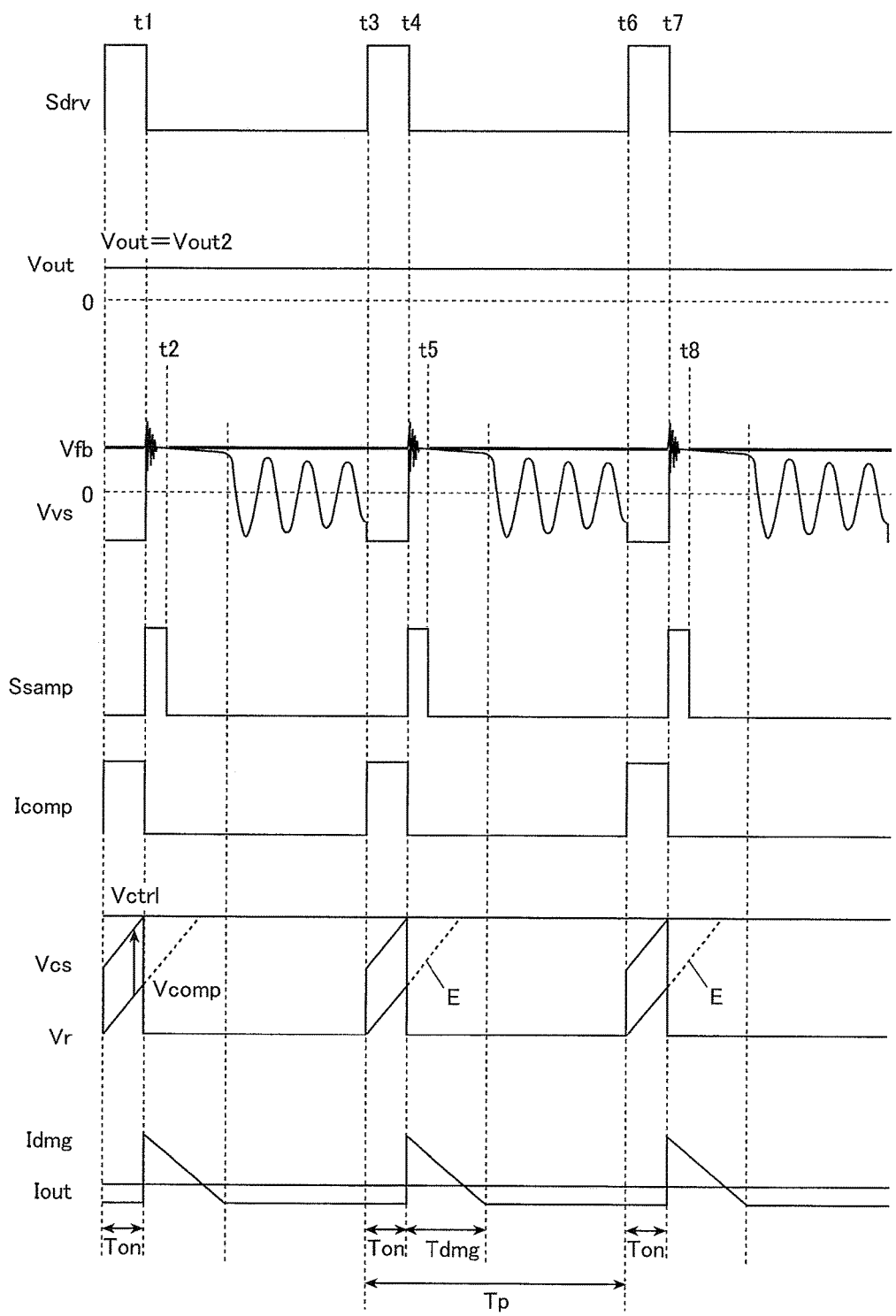
FIG. 17 illustrates waveforms indicating a variation in voltage at each component of the power controlling IC after the output voltage is adjusted to a low level according to the second embodiment.

The operation of the power controlling IC 13 in FIG. 15 after a shift of the output voltage Vout will now be explained with reference to FIGS. 16 and 17. FIGS. 16 and 17 indicate the operational timings of the switching transistor SW at the output voltage Vout equal to Vout 1 and Vout 2, respectively, where Vout 1>Vout 2; and the output current Iout equal to Iout 1. Vfb represents a voltage sampled by the sample holding circuit 34b. Idmg represents a shift in current through the secondary side winding of the transformer 12 during a demagnetization period. The waveforms indicating a shift of the voltage Vcs at the current detecting terminal CS demonstrate that the switching transistor SW is turned off after the voltage Vcs reaches the control voltage Vctrl at the control terminal CTRL.

As illustrated in FIGS. 16 and 17, the power controlling IC 13 causes the voltage Vcs at the current detecting terminal CS at the secondary side to reach the control voltage Vctrl applied to the control terminal CTRL and causes the gate drive pulse Sdry to shift from a high level to a low level at times t1, t4, and t7, at which the switching transistor SW is turned off. The voltage induced in the auxiliary winding thereby rises, resulting in a rise in a voltage Vvs at the voltage detection terminal VS. At times t1, t4, and t7, a sampling signal Ssamp shifts to a high level, which turns on a switch S1 of the sample holding circuit 34b and charges the capacitor Ch. The shift of the sampling signal Ssamp to a low level at the times t2, t5, and t8 causes the switch S1 to be turned off. The voltage Vvs at the terminal VS is held in capacitor Ch of the sample holding circuit 34b as a voltage Vfb. The voltage-current converting circuit 34c then generates a correction current Icomp inversely proportional to the held voltage Vfb. The correction current Icomp is thereby applied to the current detecting terminal CS.

Since Vout 1>Vout 2, the correction current Icomp in FIG. 17 is higher than that in FIG. 16. Thus, the voltage Vcomp raised by the correction current Icomp in FIG. 17 is also higher than that in FIG. 16. The shift of the gate drive pulse Sdry to a high level at times t3 and t6 causes the switching transistor SW to be turned on and a the current to pass through the primary side winding. During a period Ton where the voltage Vcs at the current detecting terminal CS rises, the voltage Vcs reaches the control voltage Vctrl at the secondary side at a low detection voltage Vr or a peak current Ion2 compared to a low correction current Icomp. The output voltage Vout is thereby lower than Vout 2. The output voltage detector 14 controls the voltage Vctrl such that Vout=Vout 2, resulting in increases in the control voltage Vctrl and the switching frequency. In other words, the switching frequency decreases.

If the correction current Icomp or the resistance of the correction resistor Rcomp were zero, the switching frequency would increase, resulting in a high output ripple.

However, the switching frequency decreases in this embodiment as described above, resulting in a low output ripple.

A scheme of determination of the characteristics of the switching frequency versus the output current in the power controlling IC 13 according to the present embodiment will now be described.

Figure 10:
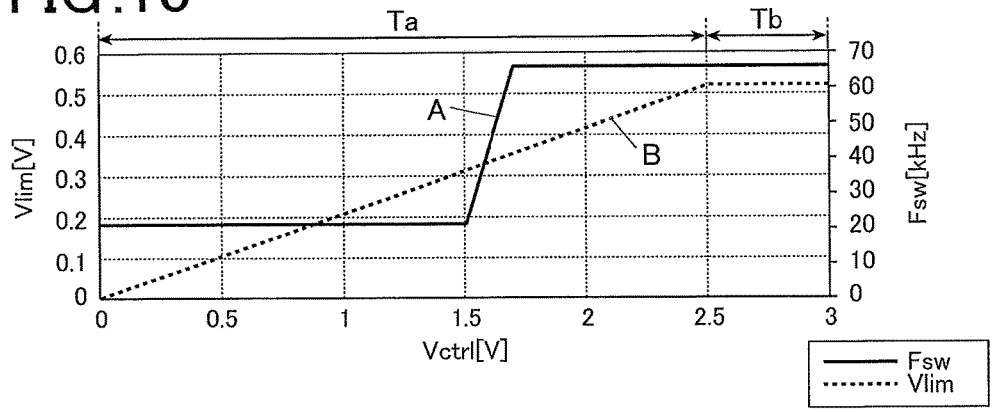
FIG. 10 is a graph indicating characteristic curves of an upper limit current detecting voltage versus the output voltage selected by a voltage selector according to the variation and characteristic curves of a frequency Fsw of an oscillating circuit versus the control voltage.
Figure 11A:
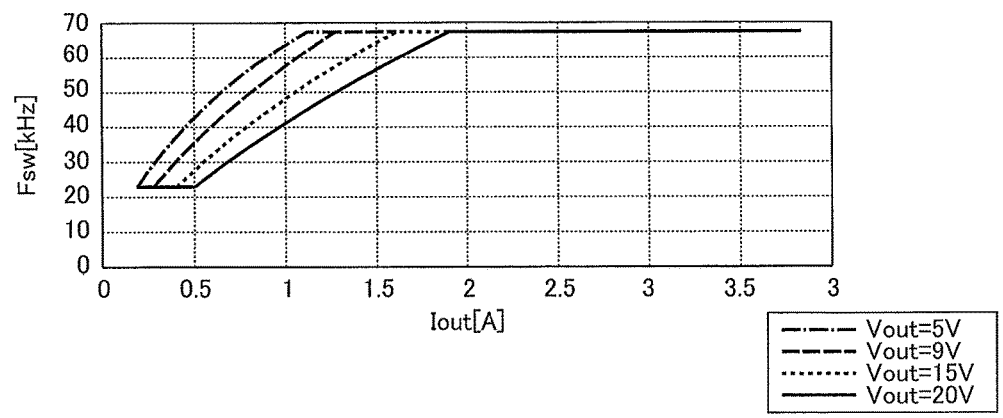
FIG. 11A is a graph indicating characteristic curves of the switching frequency Fsw versus the output current according to the implementation of the first embodiment.
Figure 11B:
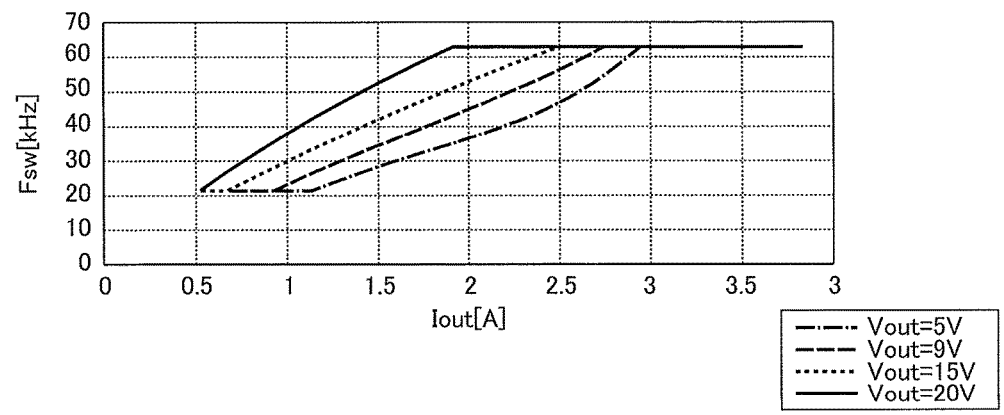
FIG. 11B is a graph indicating characteristic curves of the switching frequency Fsw versus the output current according to the variation.

An output current Iout from the switched-mode power supply in FIG. 10 including the power controlling IC 13 according to the embodiment in FIG. 10 can be represented by Expression (viii):

$$Iout=(Idmg1+Idmg2)\times 0.5\times Tdmg/Tp \quad \text{(viii)}$$

where Tp represents the switching cycle and Tdmg represents the demagnetization period. The output current Iout is a time-averaged current flowing through the secondary side winding of the transformer during a demagnetization period.

The cycle Tp is the inverse of a frequency Fsw to be determined by the overcurrent protecting function, i.e., Tp=1/Fsw. The demagnetization period Tdmg is represented by Expression (ix):

$$Tdmg=(L2\times Idmg1)/(Vout+VF) \quad \text{(ix)}$$

The demagnetization period Tdmg is proportional to a peak current Idmg1 in the secondary side winding of the transformer and an inductance L2 in the secondary side winding of the transformer and is inversely proportional to the sum of the output voltage Vout and the forward voltage VF at the diode D2.

The relation between the demagnetized current Idmg1 and the peak current Ion2 through the switching transistor SW after turning-off of the switching transistor SW is represented by Expression (x):

$$Idmg1=(N1/N2)\times Ion2 \quad \text{(x)}$$

The relation is proportional and is determined by the ratio N1/N2 of windings of the primary side winding N1 to windings of the secondary side winding N2.

The peak current Ion2 through the switching transistor SW is represented by Expression (xi):

$$Ion2=(Vctrl-Rcomp\times Icomp)/Rs \quad \text{(xi)}$$

The peak current Ion2 is determined by the control voltage Vctrl at the control terminal CTRL, the resistance of the current detecting resistor Rs, the correction current Icomp, and the resistance of the correction resistor Rcomp.

The inductance ratio of the primary side winding to the secondary side winding L1/L2 is represented by Expression (xii):

$$L1/L2=(N1/N2)^2 \quad \text{(xii)}$$

The inductance ratio is the square of the ratio N1/N2 of windings.

To consolidate the expressions (viii) to (xii), the switching frequency Fsw is represented by Expression (xiii):

$$Fsw=(2\times(Vout+VF)\times Iout)/L1\times(Rs/(Vctrl-Rcomp\times Icomp))^2 \quad \text{(xiii)}$$

The switching frequency Fsw is correlated with the output voltage Vout, the output current Iout, the control voltage Vctrl at the control terminal CTRL, the resistance of the current detecting resistor Rs, and the correction current Icomp.

Figure 18A:
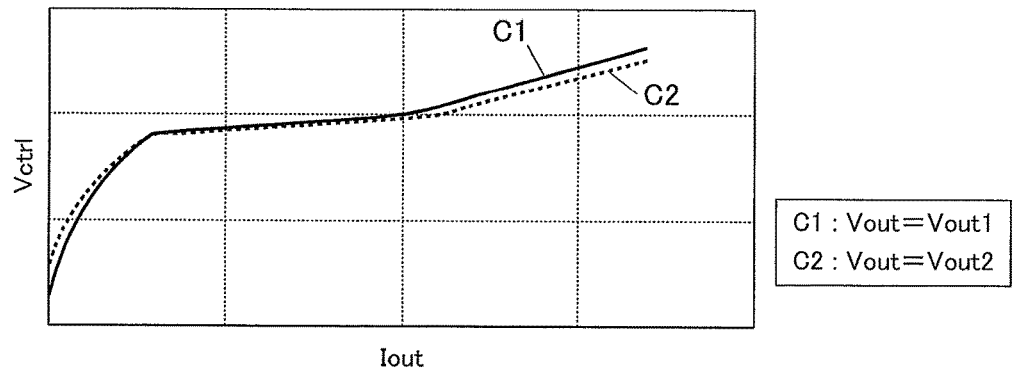
FIG. 18A is a graph indicating a shift of a characteristic curve of the control voltage versus the output current in the case of an correction resistor has a high resistance in an AC-DC converter including a power controlling IC according to a third embodiment.
Figure 18B:
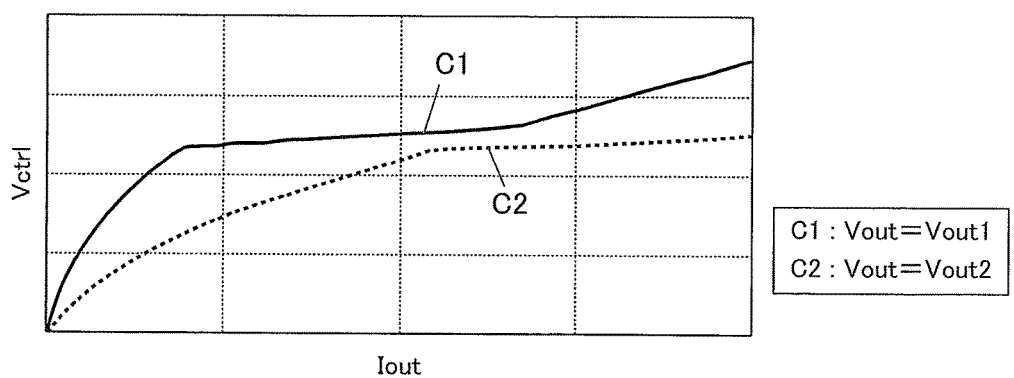
FIG. 18B is a graph indicating the shift of the characteristic curve of the control voltage versus the output current in the case of the correction resistor has a low resistance in the AC-DC converter including the power controlling IC according to the third embodiment.
Figure 18C:
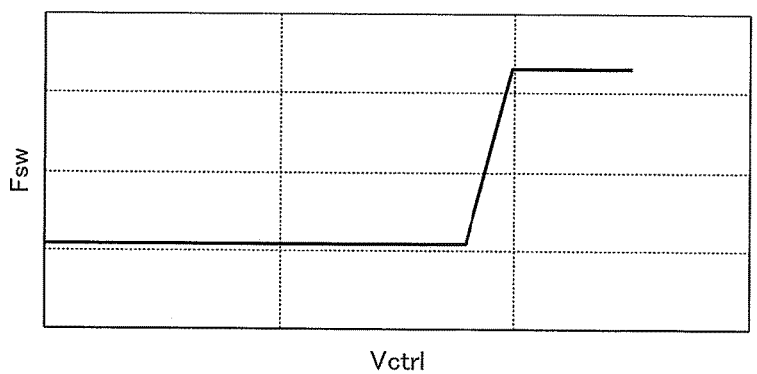
FIG. 18C is a graph indicating the relation between the switching frequency and the control voltage in the power controlling IC according to the third embodiment.

Supposing that the oscillating circuit OSC is designed so as to determine the relation between the control voltage Vctrl and the frequency Fsw of the oscillating circuit OSC as illustrated in FIG. 18C, the current detecting resistor Rs has, for example, a constant resistance whereas the correction resistor Rcomp has a high resistance, for example, 4 kΩ. Thus, the relation between the control voltage Vctrl and the output current Iout can be determined as illustrated in FIG. 18A, resulting in the characteristic curves of the switching frequency versus the output current in FIG. 14A. A design that establishes the relation between the control voltage Vctrl and the output current Iout in FIG. 18B can achieve the characteristic curves of the switching frequency versus the output current in FIG. 14B.

In each of FIGS. 18A and 18B, the solid line C1 represents a characteristic curve of the output voltage equal to Vout 1 and the dotted line C2 a characteristic curve of the output voltage equal to Vout 2, where Vout 1>Vout 2.

A switched-mode power supply that includes the power controlling IC 13 having the configuration described above and that has desired characteristics and a low ripple is designed as follows. A first upper limit current detecting voltage at a first output voltage and a first output current at the secondary side of the transformer is determined. If the output voltage is a first output voltage and the output current is a first output current in the secondary side of the transformer, the resistance of a current-voltage converting resistor connected to the current detecting terminal is determined such that the first upper limit current detecting voltage is equal to the first output voltage. If the output voltage is a second output voltage and the output current is a second output current in the secondary side of the transformer, a second upper limit current detecting voltage is determined. The resistance of the correction resistor is determined such that the second upper limit current detecting voltage is equal to the second output voltage at the second output current in response to the correction current from a correction current generating circuit corresponding to the output voltage applied to the secondary side of the transformer and such that the frequency for turning on or off a switching device is held at or below a predetermined value. A ripple restriction effect can be acquired in the case that the frequency of the switching device does not vary or increases as the intensity of the output voltage detection signal increases.

Third Embodiment

A third embodiment of a switched-mode power supply according to the present invention will now be described.

Figure 19:
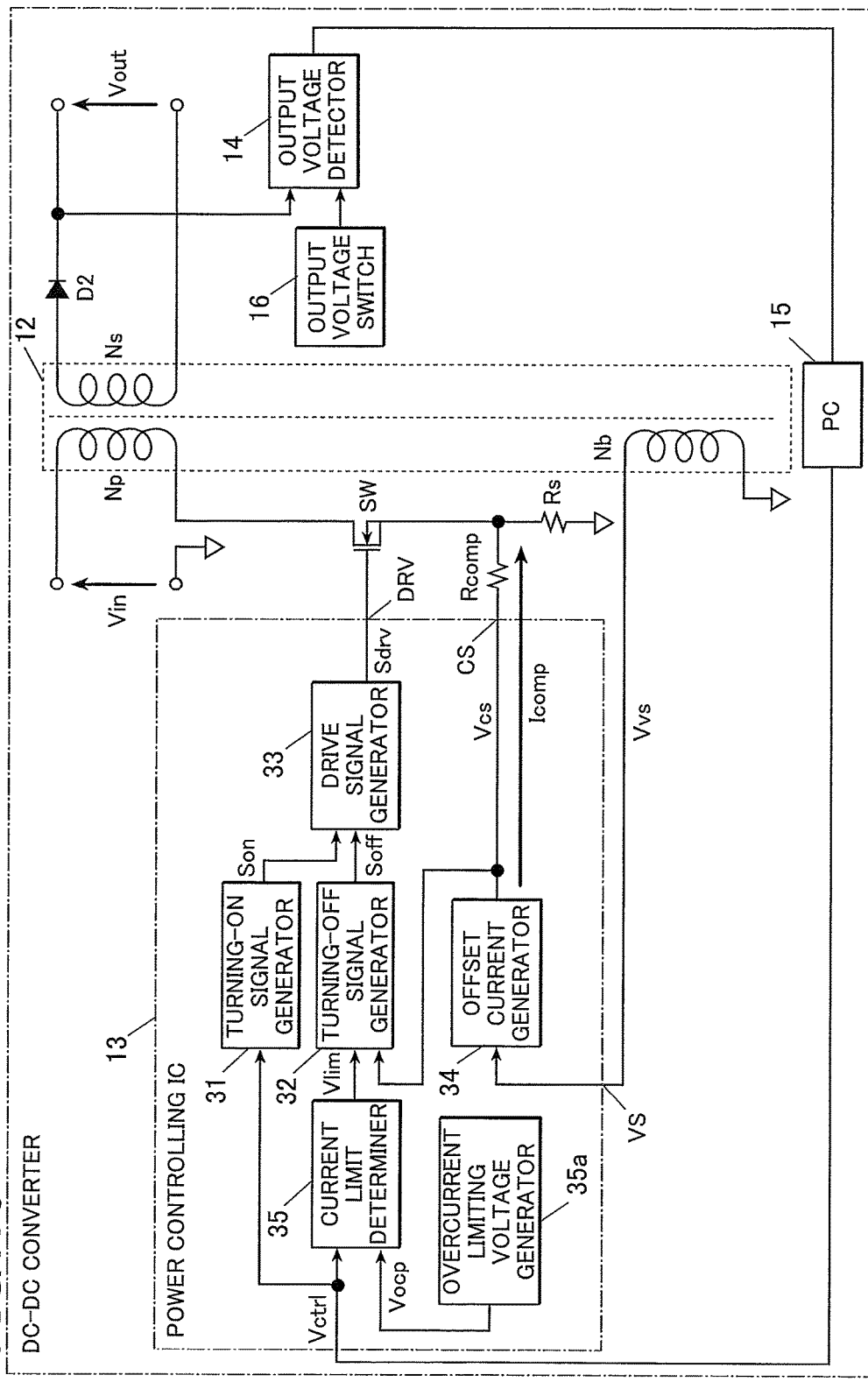
FIG. 19 is a block diagram of the power controlling IC according to the third embodiment.

FIG. 19 illustrates a circuit configuration of a switched-mode power supply or a DC-DC converter according to the third embodiment of the present invention.

The switched-mode power supply according to the third embodiment is a combination of those of the first and second embodiments. The power supply can vary the output voltage in response to a request from a device at the load side and freely determine the relation between the output voltage and the output current during the overcurrent protective operation and the relation between the output voltage and the output ripple. As in the first embodiment in FIG. 2, the switched-mode power supply includes a correction current generator 34 generating a correction current Icomp corresponding to the voltage at the voltage detection terminal VS and applying the correction current Icomp to the current detecting terminal CS; and a correction resistor Rcomp connected to the current detecting terminal CS.

The switched-mode power supply in the third embodiment has two major differences from that in the first embodiment in FIG. 2, as follows:

First, the power controlling IC of the power supply in the first embodiment applies the upper limit current detecting voltage Vlim from the current limit determiner 35 to the turning-off signal generator 32 generating the turning-off signal Soff whereas the power controlling IC of the power supply in the third embodiment selects one of the overcurrent limiting voltage Vocp and the control voltage Vctrl applied to the control terminal CTRL as the upper limit current detecting voltage Vlim and applies the selected voltage to the current limit determiner 35.

Second, the turning-on signal generator 31 of the power controlling IC in the first embodiment generates the turning-on signal Son indicating the timing for turning on the switching transistor SW at a predetermined frequency whereas the turning-on signal generator 31 of the power controlling IC in the third embodiment generates the turning-on signal Son at a frequency corresponding to the control voltage Vctrl at the control terminal CTRL.

Figure 20:
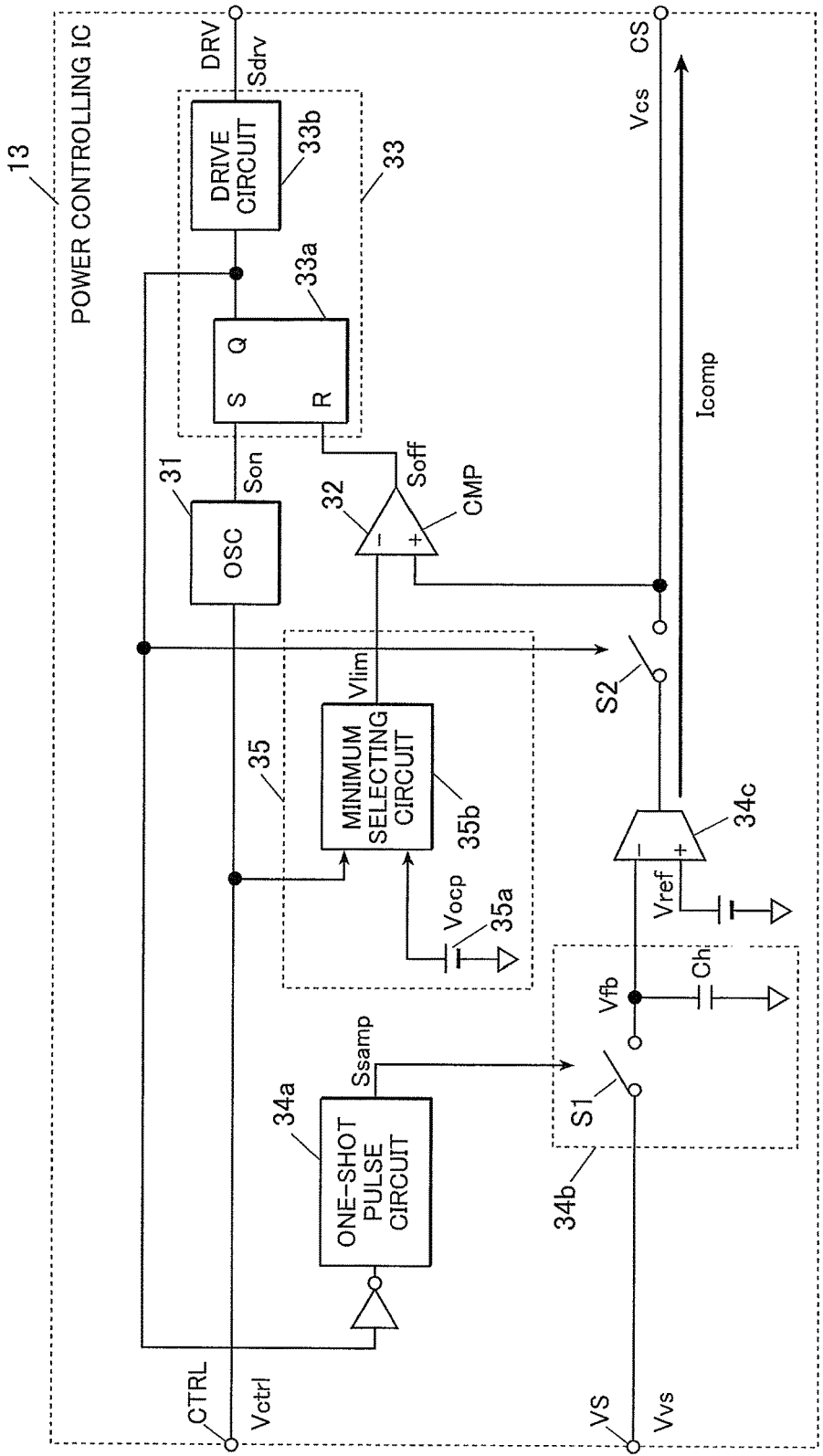
FIG. 20 illustrates a specific circuit configuration of the power controlling IC according to the third embodiment.

FIG. 20 illustrates a specific circuit configuration of the power controlling IC in FIG. 19.

As illustrated in FIG. 20, the turning-on signal generator 31, which generates the turning-on signal Son in the power controlling IC 13 according to this embodiment, includes an oscillating circuit OSC the frequency of which varies in response to the control voltage Vctrl at the control terminal CTRL.

The current limit determiner 35 includes an overcurrent limiting voltage generator 35a generating an overcurrent limiting voltage Vocp; and a minimum selecting circuit 35b selecting the lower one of the overcurrent limiting voltage Vocp and the control voltage Vctrl at the control terminal CTRL. The turning-off signal generator 32 generating the turning-off signal Soft includes a voltage comparing circuit CMP comparing the voltage Vlim selected by the minimum selecting circuit 35b, in other words, the overcurrent limiting voltage Vocp or the control voltage Vctrl with the voltage Vcs at the current detecting terminal CS.

The drive pulse generator 33 includes, for example, a RS flip-flop 33a to be set by the turning-on signal Son generated from the turning-on signal generator 31 and reset by the turning-off signal Sot f generated from the turning-off signal generator 32; and a drive circuit or driver 33b generating a gate drive pulse Sdry for the switching transistor SW connected to a terminal DRV in response to the output from the flip-flop 33a.

The correction current generator 34 includes, for example, a one-shot pulse generating circuit 34a detecting a rise or fall in the output from the flip-flop 33a and generating a sampling signal Ssamp; a sample holding circuit 34b including a switch S1 to be turned on or off by the sampling signal Ssamp and a capacitor Ch to sample the voltage Vvs at the voltage detection terminal VS; a voltage-current converting circuit 34c converting the sampled voltage into a current; and a switch S2 to be turned on or off by the output from the flip-flop 33a in a manner complementary to the switch S1 to apply the output current from the voltage-current converting circuit 34c to the current detecting terminal CS.

In response to a switching instruction from a load device, the output from the output voltage detecting circuit 14 (see FIG. 1) varies. The control voltage Vctrl at the control terminal CTRL is varied thereby, which can vary the output voltage Vout at the secondary side. The voltage-current converting circuit 34c increases the correction current Icomp as the output voltage Vout decreases or decreases the correction current Icomp as the output voltage Vout increases. The correction current Icomp is applied to the current detecting terminal CS.

In this embodiment, the resistance of the correction resistor Rcomp connected to the current detecting terminal CS or the resistances of the correction resistor Rcomp and the current detecting resistor Rs are appropriately determined, resulting in desired characteristic curves of the output current versus the output voltage when the overcurrent protecting function works as indicated in FIGS. 3A and 3B and desired characteristic curves of the switching frequency versus the output current as indicated in FIGS. 18A and 18B. The adjustment of one characteristic by a variation in resistance of the correction resistor Rcomp varies the other characteristics. The characteristics should be prioritized and be balanced.

Although the invention made by the inventor has been specifically described with reference to the embodiments, the invention is not limited to the embodiments. For example, the switching transistor SW applying an intermittent current to the primary side winding of the transformer in the present embodiments is a separate component from the power controlling IC 13. Alternatively, the switching transistor SW may be integrated with the power controlling IC 13 into one semiconductor integrated circuit.

In the present embodiments, the correction resistor Rcomp and the current detecting resistor Rs are disposed outside the power controlling IC 13. Alternatively, the correction resistor Rcomp and/or the current detecting resistor Rs may be disposed as a variable resistor(s) in the power controlling IC 13, and the variable resistance(s) may be appropriately determined by a laser or a mask option.

In the embodiments, the diode D2 is connected in series to the secondary side winding Ns to serve as a rectifier rectifying the AC voltage induced in the secondary side winding Ns. Alternatively, a different rectifying circuit, for example, a synchronous rectifier circuit may be connected in series to the secondary side winding Ns.

In the embodiments, the AC-DC converter including a power controlling IC according to the present invention is of a flyback type. Alternatively, the AC-DC converter including the power controlling IC according to the present invention may be of a forward type or a quasi-resonant type.

What is claimed is:

1. A power controlling semiconductor device for generation of a drive pulse to turn on or off a switching device which applies an intermittent current to a primary side winding of a transformer in response to a voltage proportional to a present current flowing through the primary side winding of the transformer and to an output voltage detection signal from a secondary side of the transformer, the device comprising:
   a current detecting terminal to which the voltage proportional to the present current flowing through the primary side winding is applied;
   an overcurrent detecting circuit which compares a voltage corresponding to the voltage applied to the current detecting terminal with an upper limit current detecting voltage to detect an overcurrent in the secondary side of the transformer;
   a turning-on signal generating circuit which generates a turning-on signal for periodically turning on the switching device;
   a turning-off signal generating circuit which generates a turning-off signal for turning off the switching device in response to the overcurrent detected by the overcurrent detecting circuit; and
   a correction current generating circuit which applies a correction current to the current detecting terminal, the correction current corresponding to the output voltage at the secondary side of the transformer,
   wherein the correction current generated by the correction current generating circuit is applied to a correction resistor connected to the current detecting terminal for a shift in the voltage applied to the current detecting terminal.

2. The power controlling semiconductor device according to claim 1, further comprising:
   a control terminal which receives the output voltage detection signal; and
   an overcurrent limiting voltage generator which generates a predetermined overcurrent limiting voltage,
   wherein the turning-off signal generating circuit comprises:
      a voltage selector which selects a lower one of a voltage corresponding to the voltage at the control terminal and the overcurrent limiting voltage as the upper limit current detecting voltage; and
      a voltage comparing circuit which compares the upper limit current detecting voltage selected by the voltage selector with the voltage corresponding to the voltage applied to the current detecting terminal.

3. The power controlling semiconductor device according to claim 1, wherein
   the transformer comprises an auxiliary winding, and
   the correction current generating circuit comprises:
      a sample holding circuit which holds a voltage corresponding to a voltage induced in the auxiliary winding or a divided voltage from the induced voltage during a demagnetization period of the transformer after turning-off of the switching device; and
      a voltage-current converting circuit which generates a current corresponding to the voltage held in the sample holding circuit.

4. The power controlling semiconductor device according to claim 3, wherein the correction current generating circuit generates the correction current in response to the output voltage detection signal, the voltage induced in the auxiliary winding, or the divided voltage from the induced voltage, such that, if a level of the output voltage detection signal increases from a first level to a second level, the correction current is adjusted to decrease the level of the output voltage detection signal to the first level or below.

5. The power controlling semiconductor device according to claim 1, wherein
   the turning-on signal generating circuit comprises an oscillating circuit which generates an oscillation signal at a predetermined frequency, and
   the oscillating circuit generates the oscillation signal at a frequency corresponding to the voltage at the control terminal receiving the output voltage detection signal.

6. A switched-mode power supply comprising:
   the power controlling semiconductor device according to claim 1;
   the transformer;
   the switching device which is connected in series to the primary side winding of the transformer;
   a current-voltage converting resistor which is connected in series to the switching device and applies a voltage converted from a current to the current detecting terminal;
   an output voltage detector which detects an output voltage at a secondary side of the transformer and transmits a detection signal to the power controlling semiconductor device; and
   the correction resistor which is connected between the current detecting terminal and one terminal of the current-voltage converting resistor.

7. A method of designing a switched-mode power supply comprising the power controlling semiconductor device according to claim 3, the method comprising:
   determining a number of windings and a voltage dividing ratio of a first resistor to a second resistor such that an input voltage is applied to a terminal and generates a first correction current at a first output voltage and a second correction current at a second output voltage, an induced voltage from the auxiliary winding or a divided voltage which is divided from the induced voltage being applied to the terminal, the first resistor and the second resistor being connected to the auxiliary winding;
   determining a first current limit and a second current limit for the switching device to generate a first output current at the first output voltage or a second output current at the second output voltage in the secondary side of the transformer; and
   determining resistances of a current-voltage converting resistor and a correction resistor such that the resistances serve as the first and second current limits for the switching device if the first and second output voltages and the upper limit current detecting voltage serve as overcurrent limiting voltages, the current-voltage converting resistor and the correction resistor being connected to the current detecting terminal.

8. A method of designing a switched-mode power supply comprising the power controlling semiconductor device according to claim 5, the method comprising:
   determining a first upper limit current detecting voltage at a first output voltage and a first output current at the secondary side of the transformer;
   determining a resistance of a current-voltage converting resistor connected to the current detecting terminal such that the first upper limit current detecting voltage is equal to the first output voltage at the first output current in the secondary side of the transformer;
   determining a second upper limit current detecting voltage equal to a second output voltage at a second output current in the secondary side of the transformer; and
   determining the resistance of the correction resistor such that the second upper limit current detecting voltage is equal to the second output voltage at the second output current in response to the correction current corresponding to the output voltage applied to the secondary side of the transformer by a correction current generating circuit and such that the frequency for turning on or off a switching device is held at or below a predetermined value.

9. A power controlling semiconductor device for generation of a drive pulse to turn on or off a switching device which applies an intermittent current to a primary side winding of a transformer in response to a voltage proportional to a present current flowing through the primary side winding of the transformer and to an output voltage detection signal from a secondary side of the transformer, the semiconductor device comprising:
   a current detecting terminal to which the voltage proportional to the current through the primary side winding is applied;
   a correction resistor which adjusts a resistance of a resistor connected to the current detecting terminal;
   an overcurrent detecting circuit which compares a voltage corresponding to the voltage applied to the current detecting terminal with an upper limit current detecting voltage to detect an overcurrent in the secondary side of the transformer;
   a turning-on signal generating circuit which generates a turning-on signal for periodically turning on the switching device;
   a turning-off signal generating circuit which generates a turning-off signal for turning off the switching device in response to the overcurrent detected by the overcurrent detecting circuit; and
   a correction current generating circuit which applies a correction current from the current detecting terminal to the correction resistor and the resistor connected to the current detecting terminal, the correction current corresponding to the output voltage at the secondary side of the transformer,
   wherein, in order to detect the overcurrent, the overcurrent detecting circuit compares the upper limit current detecting voltage with a voltage corresponding to an applied voltage which is applied to the current detecting terminal and which is shifted by a correction current generated by the correction current generating circuit through the correction resistor.

10. A switched-mode power supply comprising:
    the power controlling semiconductor device according to claim 9;
    the transformer;
    the switching device which is connected in series to the primary side winding of the transformer;
    a current-voltage converting resistor which is connected in series to the switching device and applies a voltage converted from a current to the current detecting terminal; and
    an output voltage detector which detects an output voltage at the secondary side of the transformer and transmits a detection signal to the power controlling semiconductor device,
    wherein the switching device is turned on or off by a drive pulse generated by the power controlling semiconductor device.

* * * * *